United States Patent
Yoshizato

(10) Patent No.: US 11,618,979 B2
(45) Date of Patent: Apr. 4, 2023

(54) METHOD FOR PRODUCING POLYURETHANE ELASTIC FIBER

(71) Applicant: SANKO CO., LTD., Fukuoka (JP)

(72) Inventor: Akihiko Yoshizato, Moriyama (JP)

(73) Assignee: SANKO CO., LTD., Fukuoka (JP)

( * ) Notice: Subject to any disclaimer, the term of this patent is extended or adjusted under 35 U.S.C. 154(b) by 128 days.

(21) Appl. No.: 17/386,701

(22) Filed: Jul. 28, 2021

(65) Prior Publication Data

US 2022/0018042 A1    Jan. 20, 2022

Related U.S. Application Data

(62) Division of application No. 16/336,393, filed as application No. PCT/JP2017/036105 on Oct. 4, 2017, now Pat. No. 11,105,020.

(30) Foreign Application Priority Data

Oct. 5, 2016    (JP) ................................ 2016-197498
Oct. 5, 2016    (JP) ................................ 2016-197499

(51) Int. Cl.
     *D01F 6/70*          (2006.01)
     *D01D 1/02*          (2006.01)
     (Continued)

(52) U.S. Cl.
     CPC ................ *D01F 6/70* (2013.01); *C08K 3/013* (2018.01); *C08K 3/04* (2013.01); *C08K 3/22* (2013.01);
     (Continued)

(58) Field of Classification Search
     CPC ..... D01F 6/70; D01F 6/72; D01F 6/78; C08L 75/04; C08L 75/02; C08L 2203/12
     See application file for complete search history.

(56) References Cited

U.S. PATENT DOCUMENTS

| | | |
|---|---|---|
| 3,715,412 A | 2/1973 | Nakahara |
| 6,403,216 B1 | 6/2002 | Doi et al. |
| | (Continued) | |

FOREIGN PATENT DOCUMENTS

| | | |
|---|---|---|
| CN | 1187547 A | 7/1998 |
| CN | 101641465 A | 2/2010 |
| | (Continued) | |

OTHER PUBLICATIONS

"JP2014091891_Machine Translation" is a machine translation of JP-2014091891-A. (Year: 2014).*

(Continued)

*Primary Examiner* — Larissa Rowe Emrich
(74) *Attorney, Agent, or Firm* — McCarter & English, LLP; David R. Burns; Wei Song

(57) ABSTRACT

A method for producing a polyurethane elastic fiber according to the present invention contains the steps of: [1] producing a polyurethane urea polymer (A) having a number average molecular weight ranging from 12,000 to 50,000, and represented by general formula (1); [2] preparing a spinning dope by adding the polyurethane urea polymer (A) to a polyurethane urea polymer (B); and [3] spinning a polyurethane elastic fiber using the spinning dope.

(1)

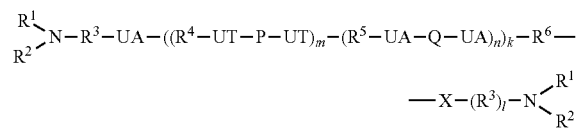

In the formula, $R^1$ and $R^2$ are an alkyl group or a hydroxyalkyl group, $R^3$ is an alkylene group, a polyethyleneoxy (Continued)

group or a polypropyleneoxy group, $R^4$ is a diisocyanate residue, X is a urethane bond or a urea bond, $R^5$ and $R^6$ are a diisocyanate residue, P is a diol residue, Q is a diamine residue, UT is a urethane bond, UA is a urea bond, each of k, l, m and n is 0 or a positive number.

5 Claims, 2 Drawing Sheets

(51) Int. Cl.
| | |
|---|---|
| D01F 6/72 | (2006.01) |
| D01F 6/78 | (2006.01) |
| C08K 3/013 | (2018.01) |
| C08K 3/04 | (2006.01) |
| C08K 3/22 | (2006.01) |
| C08K 3/36 | (2006.01) |
| C08K 5/098 | (2006.01) |
| C08L 75/02 | (2006.01) |
| C08L 75/04 | (2006.01) |
| D01F 1/02 | (2006.01) |

(52) U.S. Cl.
CPC ............ *C08K 3/36* (2013.01); *C08K 5/098* (2013.01); *C08L 75/02* (2013.01); *C08L 75/04* (2013.01); *D01D 1/02* (2013.01); *D01F 1/02* (2013.01); *D01F 6/72* (2013.01); *D01F 6/78* (2013.01); *C08K 2003/2217* (2013.01); *C08K 2003/2227* (2013.01); *C08K 2003/2296* (2013.01); *C08L 2203/12* (2013.01); *D10B 2331/10* (2013.01); *D10B 2401/061* (2013.01)

(56) References Cited

U.S. PATENT DOCUMENTS

| | | | |
|---|---|---|---|
| 6,468,652 | B1 | 10/2002 | Tsuru |
| 8,277,941 | B2 | 10/2012 | Tanaka et al. |
| 2010/0184347 | A1 | 7/2010 | Kojima et al. |
| 2020/0017996 | A1 | 1/2020 | Yoshizato |

FOREIGN PATENT DOCUMENTS

| | | | | | |
|---|---|---|---|---|---|
| CN | 101680127 | A | | 3/2010 | |
| JP | 46-02904 | B | | 1/1971 | |
| JP | S61-007212 | B2 | | 3/1986 | |
| JP | H03-006177 | B2 | | 1/1991 | |
| JP | 2000-313802 | A | | 11/2000 | |
| JP | 2002-339166 | A | | 11/2002 | |
| JP | 2006-118102 | A | | 5/2006 | |
| JP | 2009-24320 | A | | 2/2009 | |
| JP | 2009024320 | A | * | 2/2009 | ......... C08G 18/0828 |
| JP | 47-48895 | B2 | | 8/2011 | |
| JP | 47-51645 | B2 | | 8/2011 | |
| JP | 2012-193259 | A | | 10/2012 | |
| JP | 2014-91891 | A | | 5/2014 | |
| JP | 2014-95162 | A | | 5/2014 | |
| JP | 2014091891 | A | * | 5/2014 | |
| JP | 2014095162 | A | * | 5/2014 | |
| WO | 2007/074814 | A1 | | 7/2007 | |
| WO | 2008/153080 | A1 | | 12/2008 | |

OTHER PUBLICATIONS

"JP2009024320_Machine Translation" is a machine translation of JP-2009024320-A. (Year: 2009).*
"JP2014095162_Machine Translation" is a machine translation of JP-2014095162-A. (Year: 2014).*
International Search Report for Application No. PCT/JP2017/036105, dated Nov. 14, 2017, 4 pages.
Chinese Office Action for Application No. 201780072940.3, dated Jan. 3, 2020, 7 pages.
German Office Action for Application No. 112017005050.2, dated Mar. 4, 2020.
U.S. Appl. No. 16/336,393, filed Mar. 25, 2019, 2020-0017996, Allowed.

* cited by examiner

METHOD FOR PRODUCING POLYURETHANE ELASTIC FIBER

CROSS-REFERENCE TO RELATED APPLICATIONS

This application is a divisional application of U.S. patent application Ser. No. 16/336,393 filed on Mar. 25, 2019 and now U.S. patent Ser. No. 11/105,020, which is a U.S. national stage filing, under 35 U.S.C. § 371(c), of International Application No. PCT/JP2017/036105 filed on Oct. 4, 2017, which, in turn, claims priority to Japanese Patent Application No. 2016-197498 filed on Oct. 5, 2016; and Japanese Patent Application No. 2016-197499 filed on Oct. 5, 2016.

TECHNICAL FIELD

The present invention relates to a method for producing a polyurethane elastic fiber. That is, the present invention relates to a method for producing a polyurethane elastic fiber exhibiting extremely reduced scum formation and further having a superior heat setting property, and a superior dyeability and color fastness. In addition, the present invention relates to a method for easily producing a polyurethane elastic fiber in which during dry spinning using a spinning dope in which the aggregation of an inorganic functional agent is suppressed, superior spinning productivity with stability is exhibited, scum is not formed on the surface of the fiber and superior metal-abrasion resistance is exhibited.

BACKGROUND ART

Polyurethane elastic fibers possess rich elasticity and due to the superior physical properties and chemical properties thereof, polyurethane elastic fibers are widely used for textile products such as foundation garments, underwear, body suits, leggings, panty hoses, swimsuits, jeans wear, sportswear and sanitary materials.

In general, polyurethane elastic fibers are interlaced or interwoven with other fiber materials such as nylon fibers, and used. In particular, the polyurethane elastic fibers are used in combination with nylon fibers in many cases. The fabric thereof is usually dyed with an acidic dye, an acidic mordant dye, and a metal-containing dye, which are anion-based dyes used as dyes for nylon.

However, in the fabric products containing the polyurethane elastic fibers, the polyurethane elastic fibers have low color fastness. For this reason, there are problems that during washing the fiber products, the dye falls out of the polyurethane fibers in the bath and color fading occurs, or when the fiber products are rubbed with another fabric, other laundry may be contaminated with the dye. In addition, the polyurethane elastic fibers are different from nylon in view of affinity to the dye. For this reason, the nylon fibers are well dyed but polyurethane elastic fibers are thinly dyed in some cases. In the interlaced fabric of nylon and polyurethane elastic fibers, there is a problem of reduction of aesthetic properties, caused by color mismatch even in the case of the same color.

That is, the polyurethane elastic fibers are not satisfactory in dyeability and color fastness during washing. Conventionally, various investigations have been carried out, such as studies for the processing conditions during dyeing, development of dyes, modification of polyurethane polymers themselves, incorporation of additives into polyurethane, and the like. However, they have not been sufficient yet, and further improvement on the dyeing performance of the polyurethane elastic fibers has been desired.

In addition, the polyurethane elastic fibers exhibit rich elasticity, but exhibit inferior dimensional stability when they are formed into a fabric. For this reason, there arise problems that the fabric curls after cutting the fabric to burden the worker when sewing the fabric into a product, and a poor setting property arises such as shrinking the size of clothing products during wearing. It is also possible to set at a high temperature, but polyurethane easily causes thermal deterioration. In addition, as another problem of the polyurethane elastic fibers, they are inherently tacky, so that there is a problem that yarn breakage tends to occur during the knitting process of the fabric due to metal friction with the knitting needles or guides. In addition, when scum is formed, the abrasion caused by metal such as needles or guides may be further accelerated.

In order to solve the problems mentioned above, many investigations have been conventionally carried out. For example, an attempt in order to improve the dyeability of the polyurethane has been carried out by adding a compound having a tertiary nitrogen group is incorporated in the main chain of a urethane polymer, or a compound having a tertiary nitrogen group in the side chain of a polyacrylic acid, to a polymer (see Japanese Examined Patent Application, Second Publication No. S47-51645, Japanese Examined Patent Application, Second Publication No. S47-48895, Japanese Examined Patent Application, Second Publication No. S46-2904, and Japanese Examined Patent Application, Second Publication No. S61-7212). However, in the case where a compound having a tertiary nitrogen group is built in the main chain of the polyurethane polymer, or in the case where a compound having a tertiary nitrogen group at the side chain of the polyacrylic acid is added to the main chain, the crystal structure in the polyurethane structure is disturbed thereby. For this reason, there may be problems such as reduction of heat resistance of the fiber due to the heat flow and reduction of the elastic recovery property which is a physical property of the elastic fiber.

In addition, Japanese Unexamined Patent Application, First Publication No. 2014-095162 attempts to improve the polyurethane resin constituting the polyurethane elastic fiber by using a low-molecular-weight urea compound having a molecular weight of 300 or more and less than 2,000 and having tertiary nitrogen groups at the terminal groups. The aforementioned low-molecular-weight urea compound has a high concentration of the tertiary nitrogen group which is a dyeing group in one molecule, and for this reason, the high dyeing effect is exhibited even in the case of adding the compound in a small amount. However, the low-molecular-weight urea compound has poor affinity with a polyurethane, and for this reason, there is a problem that scum (yarn scum) tends to occur. Such an occurrence of scum as described above is due to the inferior affinity of the urea bond for the polyurethane urea polymer, as compared with that of the urethane bond.

In addition, Japanese Unexamined Patent Application, First Publication No. 2014-091891 proposes that the aforementioned problems are improved by using a polyurethane polymer having a molecular weight ranging from 2,000 to 100,000 and having a specific structure in which the terminal groups are tertiary nitrogen groups. A part of the polyurethane polymer obtained in Japanese Unexamined Patent Application, First Publication No. 2014-091891 has a relatively high molecular weight and entangles with the fibers. For this reason, scum formation as described above difficultly occurs. On the other hand, the tertiary nitrogen groups are present at the terminal groups of the molecule, and for this reason, in the case of a high molecule, the concentration as the dyeing group is reduced, so that the dyeability is reduced. In addition, under the production conditions for reducing the molecular weight in order to increase the concentration of the dyeing group in one molecule, a large amount of a diisocyanate compound as an unreacted raw material remains in the step of the prepolymer reaction which is the reaction between the diol compound and the diisocyanate compound. For this reason, the low molecular weight urea compounds are mixed in a large amount. Therefore, the polyurethane polymer obtained by setting the molecular weight at a low value inevitably contains a large amount of compounds corresponding to the low-molecular-weight urea compounds as described in Japanese Unexamined Patent Application, First Publication No. 2014-095162 mentioned above, so that scum generation is inevitable.

Furthermore, Japanese Unexamined Patent Application, First Publication No. 2009-024320 discloses polyurethane elastic fibers characterized in that the main constitutional components of the raw materials are a polymer diol and a diisocyanate, a polymer of a compound having a sulfonic acid group as an anionic functional group is contained, and the dyeability is exhibited at the time of dyeing with a cationic dye. Japanese Unexamined Patent Application, First Publication No. 2012-193259 discloses that the dispersibility of inorganic particles is improved by using a polycarboxylic acid copolymer compound as an anionic functional group. However, in the case where a polymer of a compound having an anionic functional group is used alone, the weakly basic dyeing sites present in the polyurethane polymer, per se, are blocked by the anionic functional group, and for this reason, the acid dye cannot adsorb and bind to the polyurethane polymer. Therefore, the polyurethane polymer in which only the compound having the anionic functional groups is added to the polymer has a reduced dyeability, as compared with that of the unadded polyurethane polymer.

As described above, it has been already known that a tertiary nitrogen group-containing compound is effective for improving the dyeability of the polyurethane elastic fibers. However, when the amount of the functional group is reduced, the sufficient dyeability cannot be obtained. On the other hand, if a low-molecular-weight urea compound having an increased amount of the tertiary nitrogen functional group is used, the compound may bleed out from the polyurethane elastic fibers to which the compound has been added, and result in scum, or the elastic properties of the polyurethane elastic fibers may be deteriorated. Dye adsorption characteristics of the polyurethane elastic fibers are different from those of the other fibers such as nylon which are mixed with the polyurethane elastic fibers, and for this reason, the different coloring phenomenon occurs between the polyurethane and the nylon in the case of carrying out dyeing with the blended dyes of three primary colors. Therefore, there is a problem that color matching is also difficult.

Furthermore, the polyurethane elastic fibers correspond to an originally flexible and sticky material, and for this reason, yarn breakage and the like easily occur due to friction resistance by the rollers or guides in a spinning process, and therefore, addition of the fine powder such as titanium oxide to the polyurethane polymer is usually carried out in order to solve the problem mentioned above. However, the tertiary nitrogen-containing compound has a problem such as promoting flocculation of titanium oxide or hydrotalcite in a solution for polyurethane spinning, and conversely increasing yarn breakage during spinning.

Japanese Examined Patent Application, Second Publication No. H03-6177 discloses that a specific polymer containing a tertiary nitrogen and having a maleimide structure does not form scum, does not lower a property of recovering elongation of polyurethane elastic fibers, is not extracted even with perchloroethylene or the like, also has good durability, and can improve dyeability of polyurethane. However, even in this case, a problem may occur that the flocculation of titanium oxide or hydrotalcite is accelerated in a solution for polyurethane spinning, and conversely yarn breakage during spinning is increased in some cases.

SUMMARY OF INVENTION

As described above, it has been already known that a tertiary nitrogen group-containing compound is effective for improving the dyeability of polyurethane elastic fibers. However, when the tertiary nitrogen group is mainly present in the main chain of the polymer, or in the case where the affinity between the tertiary nitrogen group-containing compound and the polyurethane polymer is not good, an adverse effect is exhibited with respect to the performance of the polyurethane elastic fibers.

An object of the present invention is to solve the aforementioned problems, that is, (1) to improve dyeability, vividly develop the color, and suppress the formation of scum of low molecular weight urea compounds;

(2) to improve dyeability of polyurethane elastic fibers by using an anionic copolymerizable compound as a dyeing aid in combination with a terminal tertiary nitrogen-containing compound; and (3) to improve stability in a spinning process by using a polymer of a compound having an anionic functional group in combination therewith to suppress clumping of the inorganic functional agent although the terminal tertiary nitrogen-containing compound tends to promote the clumping of the inorganic functional powder.

As a result of carrying out intensive studies to solve the problems mentioned above and carrying out extensive experiments, the inventors of the present application found that a polyurethane elastic fiber containing a polyurethane urea polymer having the tertiary nitrogen groups at the terminals of the polymer and having a molecular weight controlled within a desired range, simultaneously improves the dyeability, the heat resistance, the heat setting property and the spinnability, and at the same time, controls the occurrences of scum and yarn breakage. In addition, the inventors of the present application found that as a method for producing the polyurethane urea polymer mentioned above, the desired polyurethane urea polymer which has the tertiary nitrogen groups at the terminals, has an intermediate molecular weight and suppresses contamination of the low molecular weight urea compound can be easily produced by heating a mixture containing a polyurethane urea polymer and a specific diamino compound having a primary nitrogen group and a tertiary nitrogen group in the molecule at the same time under specific reaction conditions, without undergoing a prepolymer reaction.

In addition, as a result of intensive studies focusing on increasing the dyeing effect by reducing the amount of amines effective for acidic dyes to solve the aforementioned problems, the inventors of the present application found that a dyeability is reduced by using only a compound having an anionic functional group, but a surprisingly synergistic effect is exhibited by combining the compound with a polyurethane urea polymer containing the tertiary nitrogen compounds at the terminals according to the present embodiment, and in addition, found that an effect of suppressing aggregation of an inorganic functional agent. Thereby, the present invention was accomplished.

That is, the present invention is as described below.

[1]

A method for producing a polyurethane elastic fiber, containing the steps of:

(1) producing a polyurethane urea polymer (A) which is represented by general formula (1) described below, has a number average molecular weight calculated in terms of polystyrene ranging from 12,000 to 50,000, and has tertiary nitrogen groups at the terminal groups, by adding a diamino compound (2) represented by general formula (2) described below in a ratio ranging from 0.01 to 15 parts by mass with respect to 100 parts by mass of a solid content of a polyurethane urea polymer (B) obtained by reacting a prepolymer obtained by reacting a high-molecular diol and a diisocyanate with an active hydrogen-containing compound, and subsequently heating;

[Chem. 1]

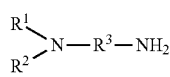
(2)

{wherein $R^1$ and $R^2$ each independently represent an alkyl group or a hydroxyalkylene group, having 1 to 5 carbon atoms, or $R^1$ and $R^2$ are bonded to form a heterocyclic group together with the nitrogen atom to which they are bonded, and $R^3$ represents a linear or branched alkyl group having 1 to 5 carbon atoms, a group having 1 to 5 ethyleneoxy repeating units or a group having 1 to 5 propyleneoxy repeating units}

[Chem. 2]

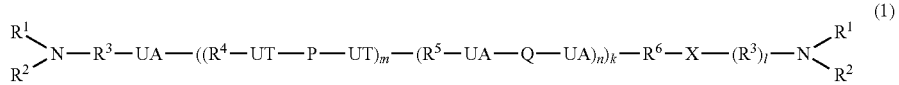

{wherein $R^1$ and $R^2$ are the same or different and represent a linear or branched alkyl group or hydroxyalkyl group having 1 to 10 carbon atoms, or $R^1$ and $R^2$ are bonded to form a heterocyclic group together with the nitrogen atom to which they are bonded, $R^3$ is a linear or branched alkylene group having 1 to 8 carbon atoms, an ethyleneoxy group having 1 to 5 repeating units or a propyleneoxy group having 1 to 5 repeating units, $R^4$ is a diisocyanate residue, X is a urethane bond or a urea bond, $R^5$ and $R^6$ are the same or different diisocyanate residue, P is a diol residue, Q is a diamine residue, UT is a urethane bond, UA is a urea bond, each of k, l, m and n is a positive number, either m or n may be 0, and l may be 0}

(2) preparing a spinning dope containing a solvent by adding a solid content of the aforementioned polyurethane urea polymer (A) in a ratio of 0.01 to 20 parts by mass based on 100 parts by mass of the solid content of the polyurethane urea polymer (B); and (3) spinning a polyurethane elastic fiber using the spinning dope mentioned above.

[2]

The method for producing a polyurethane elastic fiber, according to the aforementioned [1], wherein the spinning dope contains a polymer of a compound having an anionic functional group.

[3]

The method for producing a polyurethane elastic fiber, according to the aforementioned [2], wherein the anionic functional group mentioned above is selected from the group consisting of a carboxyl group, a sulfonic acid group, a nitro group, and a phosphoric acid group.

[4]

The method for producing a polyurethane elastic fiber, according to the aforementioned [2] or [3], wherein the anionic functional group mentioned above is contained in an amount of 10 mmol/kg or more and 200 mmol/kg or less in the polyurethane elastic fibers mentioned above.

[5]

The method for producing a polyurethane elastic fiber, according to any one of the aforementioned [1] to [4], wherein the polyurethane elastic fiber contains an inorganic functional agent selected from the group consisting of a fatty acid metal salt having 5 to 40 carbon atoms in which the metal is selected from the group consisting of magnesium, calcium, aluminum, and zinc; titanium oxide; zinc oxide; a metal complex salt of silicon dioxide and zinc oxide; a hydrotalcite compound; a huntite compound; a solid solution of MgO and ZnO; a composite of silicon dioxide and zinc oxide; a composite salt of silicon dioxide and zinc oxide; a composite salt of silicon dioxide, zinc oxide, and alumina; porous synthetic silica; carbon black; a coloring agent; and a pigment, in a ratio ranging from 0.1 to 10 parts by mass of with respect to 100 parts by mass of the solid content of the polyurethane urea polymer (B).

Effects of Invention

According to the present invention, a method for producing a polyurethane elastic fiber can be provided, in which the dyeability, and the color fastness against cleaning or dry cleaning are improved, and the heat setting property and the stable spinning productivity can be secured without deteriorating heat resistance, as well as during or after a spinning step occurrences of scum or yarn breakage can be suppressed.

MODES FOR CARRYING OUT THE INVENTION

Figure 1:
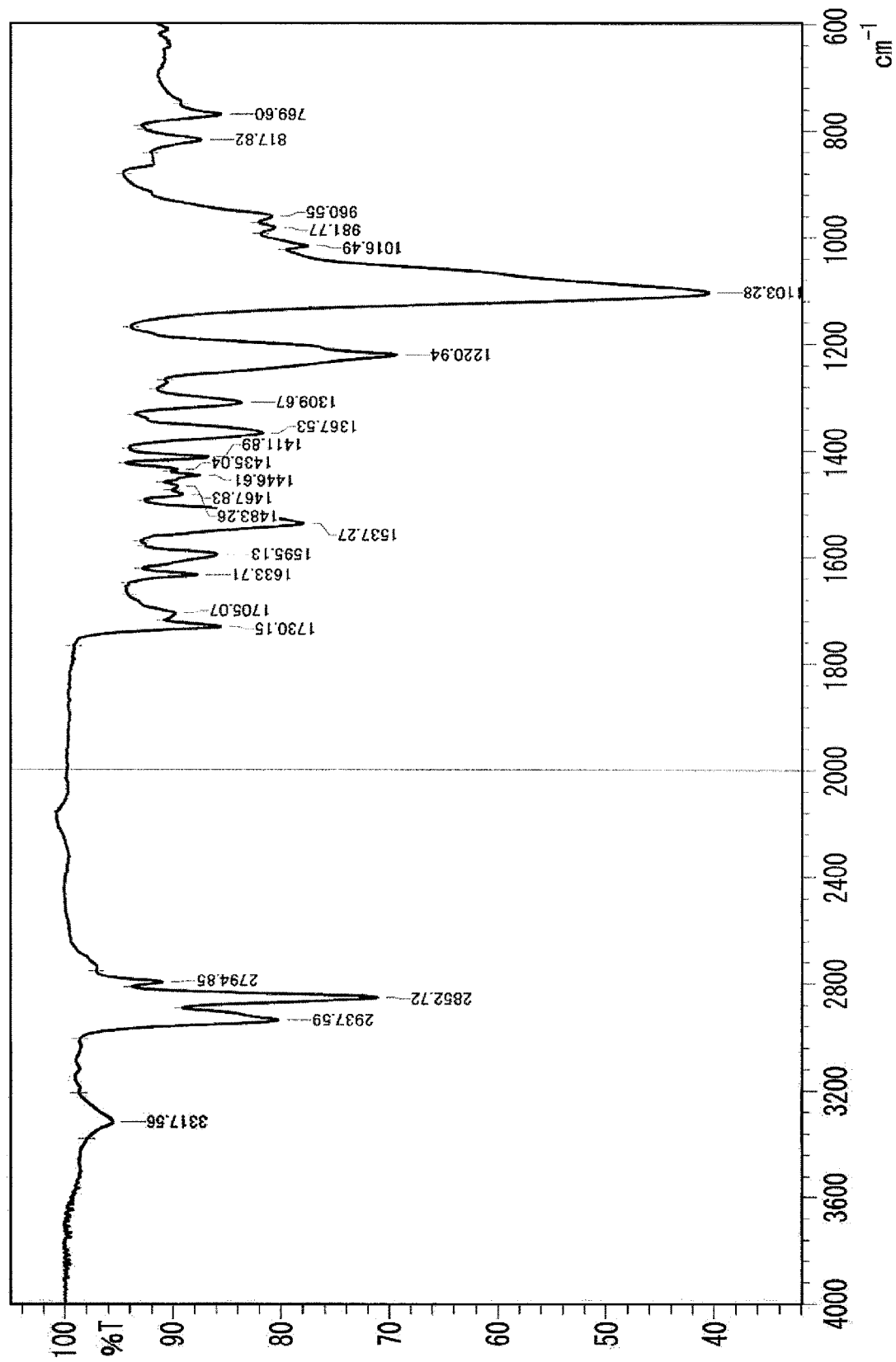
FIG. 1 is a chart showing an IR chart of an N-1 compound produced in the Example.

Hereinafter, modes for carrying out the present invention (hereinafter simply referred to as "present embodiments")

are described in detail by "Embodiment 1" and "Embodiment 2". The embodiments described below are examples for explaining the present invention and are not intended to limit the present invention thereto. The present invention can be carried out by appropriately modifying within the scope of the gist thereof.

A method for producing a polyurethane elastic fiber according to Embodiment 1 contains the steps of:

(1) producing a polyurethane urea polymer (A) represented by general formula (1) described below, having a number average molecular weight calculated in terms of polystyrene ranging from 12,000 to 50,000, and having tertiary nitrogen groups at the terminal groups, by adding a diamino compound (2) represented by general formula (2) described below in a ratio ranging from 0.01 to 15 parts by mass with respect to 100 parts by mass of a solid content of a polyurethane urea polymer (B) obtained by reacting a prepolymer obtained by reacting a high-molecular diol and a diisocyanate with an active hydrogen-containing compound, and subsequently heating;

[Chem. 3]

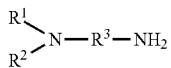

(2)

{wherein $R^1$ and $R^2$ each independently represent an alkyl group or a hydroxyalkylene group, having 1 to 5 carbon atoms, or $R^1$ and $R^2$ are bonded to form a heterocyclic group together with the nitrogen atom to which they are bonded, and $R^3$ represents a linear or branched alkyl group having 1 to 5 carbon atoms, a group having 1 to 5 ethyleneoxy repeating units, or a group having 1 to 5 propyleneoxy repeating units}

[Chem. 4]

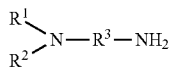

(1)

{wherein $R^1$ and $R^2$ are the same or different and represent a linear or branched alkyl group or hydroxyalkyl group having 1 to 10 carbon atoms, or $R^1$ and $R^2$ are bonded to form a heterocyclic group together with the nitrogen atom to which they are bonded, $R^3$ is a linear or branched alkylene group having 1 to 8 carbon atoms, an ethyleneoxy group having 1 to 5 repeating units or a propyleneoxy group having 1 to 5 repeating units, $R^4$ is a diisocyanate residue, X is a urethane bond or a urea bond, $R^5$ and $R^6$ are the same or different diisocyanate residue, P is a diol residue, Q is a diamine residue, UT is a urethane bond, UA is a urea bond, each of k, l, m and n is a positive number, either m or n may be 0, and l may be 0}

(2) preparing a spinning dope containing a solvent by adding a solid content of the aforementioned polyurethane urea polymer (A) in a ratio of 0.01 to 20 parts by mass with respect to 100 parts by mass of the solid content of the polyurethane urea polymer (B); and (3) spinning a polyurethane elastic fiber using the spinning dope mentioned above.

(Diamino Compound and Polyurethane Polymers (A) and (B))

The polyurethane urea polymer (A) according to Embodiment 1, which is one of the constituent components of the polyurethane elastic fiber described above, can be produced by, for example, as described below, adding to 100 parts by mass of the solid content of the polyurethane polymer (B), the diamio compound represented by the following general formula (2):

[Chem. 5]

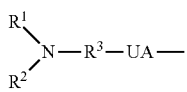

(2)

{wherein $R^1$ and $R^2$ each independently represent an alkyl group or a hydroxyalkylene group, having 1 to 5 carbon atoms, or $R^1$ and $R^2$ are bonded to form a heterocyclic group together with the nitrogen atom to which they are bonded, and $R^3$ represents a linear or branched alkyl group having 1 to 5 carbon atoms, a group having 1 to 5 ethyleneoxy repeating units, or a group having 1 to 5 propyleneoxy repeating units} in a ratio ranging from 0.01 to 15 parts by mass, and subsequently heating.

The diamino compound used in Embodiment 1 is a single active hydrogen compound having a tertiary nitrogen group and having a primary nitrogen group which allows the molecular weight of the polyurethane urea polymer (B) to be controlled by an amino exchange reaction, in the molecule at the same time. As examples thereof, the following compounds can be mentioned. For example, amine compounds such as dimethylaminoethylamine, diethylaminoethylamine, dipropylaminoethylamine, N,N-diisopropylaminoethylamine, dimethylaminopropylamine, diethylaminopropylamine, dibutylaminopropylamine, dimethylaminoethoxypropylamine, diethanolaminopropylamine, N-aminoethylpiperidine, N-aminoethyl-4-pipecoline, N-aminopropylpiperidine, N-aminopropyl-2-pipecoline, N-aminopropylmorpholine, 4-aminomethyl-1-butylpiperidine, dimethylaminoethoxypropylamine, N-aminoethylpiperidine, N-aminoethyl-4-pipecoline, N-aminopropylpiperidine, N-aminopropyl-2-pipecoline, N-aminopropylmorpholine, and 4-aminomethyl-1-butylpiperidine may be mentioned. Among these compounds, diethylaminopropylamine and dibutylaminopropylamine are more preferable.

The preparation embodiment of the polyurethane urea polymer (A) is characterized in that the diamino compound mentioned above is added in a ratio of 0.01 to 15 parts by mass with respect to 100 parts by mass of the solid content of the polyurethane urea polymer (B) described below. By reacting both the components under the heating conditions described below, it is possible to produce the polyurethane urea polymer (A) having a number average molecular weight calculated in terms of polystyrene ranging from 12,000 to 50,000, which has the tertiary nitrogen groups mentioned above at the terminals of the polymer as represented by the aforementioned formula (1).

When the addition amount of the diamino compound mentioned above falls within this range, the polyurethane elastic fibers, in which the maximum effects of Embodiment 1 can be obtained, that is, the dyeability, the heat resistance, the heat setting property and the spinnability can be improved at the same time, as well as occurrences of scum or yarn breakage in the subsequent steps can be suppressed.

Next, the polyurethane urea polymer (B) used in Embodiment 1 is described. The polyurethane urea polymer (B) can be obtained by a known method of reacting a prepolymer obtained by reacting a high-molecular diol and a diisocyanate, with an active hydrogen-containing compound.

As examples of the high-molecular diol mentioned above, mention may be made of a polyester diol, a polycarbonate diol, a polyether diol, and the like. A polyether diol is preferable, and a polyalkylene ether diol in which one type or two or more types of linear or branched alkylene groups having 2 to 10 carbon atoms are ether-bonded is particularly preferable.

As the polyalkylene ether diol, a homopolymerized or copolymerized polyalkylene ether diol is preferable. The number average molecular weight (Mn) of the polyalkylene ether diol used in the present invention preferably ranges from 500 to 6,000, and more preferably ranges from 1,000 to 3,000. In the case where Mn is less than 500, the elastic recovery property is reduced. On the other hand, in the case where Mn is more than 6,000, the spinnability is impaired.

In the copolymerized polyalkylene ether diol, the alkylene group is ether-bonded in a block or random manner. As compared with PTMG (polytetramethylene ether glycol), which is a homopolymerized polyalkylene ether diol conventionally and widely used as a raw material of polyurethane elastic fibers, in the case of the polyurethane elastic fibers using a copolymerized polyalkylene ether diol formed by two or more types of alkylene groups, the diol component occupying 65% by mass to 85% by mass of the polyurethane component is amorphous, and for this reason, the dye easily permeates into the polyurethane polymer, and the diamino compound and the dye are efficiently bonded to each other in the polyurethane elastic fibers. For this reason, vivid color development with the better dyeability and the better hue can be obtained.

Furthermore, as an advantage of using the copolymerizable diol, the elastic function can be further improved, and for this reason, the polyurethane elastic fibers have superior elastic function, that is, high elongation at break, small stress fluctuation against strain upon elongation, hysteresis loss with small stress upon elongation, and the like. Therefore, pantyhose and outerwear using the same have superior elastic function, provide a superior wearing sensation, and correspond to a fiber product with good aesthetic properties. Among the copolymerizable polyalkylene ether diols, a copolymerizable polyalkylene ether diol containing a butylene group, that is, a tetramethylene ether unit is preferable from the viewpoints of water resistance, light resistance, abrasion resistance, elastic function and the like of the resulting polyurethane elastic fibers. Furthermore, a combination of a butylene group, that is, a tetramethylene ether unit and a 2,2-dimethylpropylene group, that is, a neopentylene ether unit, or a combination of a tetramethylene ether unit and a 2-methylbutylene group is preferable.

The alkylene ether unit other than the tetramethylene group is preferably contained in an amount of 4% by mol or more and 85% by mol or less. When the amount of the alkylene ether unit is less than 4% by mol, the effect of improving the elastic function of the polyurethane urea elastic fibers is small. On the other hand, when the amount exceeds 85% by mol, the strength or elongation of the elastic fibers is considerably reduced.

Examples of the diisocyanate mentioned above include known aliphatic, alicyclic or aromatic organic diisocyanates having two isocyanate groups in the molecule. As specific examples thereof, mention may be made of organic diisocyanates such as 4,4'-diphenylmethane diisocyanate, 2,4- or 2,6-tolylene diisocyanate, p-phenylene diisocyanate, 1,5-naphthalene diisocyanate, xylylene diisocyanate, hexamethylene diisocyanate, isophorone diisocyanate, 4,4'-dicyclohexylmethane diisocyanate and the like. 4,4'-diphenylmethane diisocyanate is preferable. In addition, as the organic diisocyanate, a compound having a blocked isocyanate group which can be converted into a free isocyanate group may be used.

As the bifunctional active hydrogen-containing compound which reacts with the isocyanate group, it is possible to use a conventional chain extender in polyurethane, that is, a compound having a low molecular weight of 500 or less and containing at least 2 hydrogen atoms, which can react with isocyanate to form a urea group or a urethane group. As specific examples thereof, mention may be made of diamines such as ethylenediamine, propylenediamine, tolylenediamine, m-xylylenediamine, 1,3-diaminocyclohexane, isophoronediamine, hydrazine, 4,4'-diaminodiphenylmethane, dihydrazide, and piperazine, diamine compounds disclosed in Japanese Unexamined Patent Application, First Publication No. H5-155841, diols such as ethylene glycol, propylene glycol, and 1,4-butanediol, and the like. As the preferable examples, ethylenediamine, 1,2-propylenediamine, and the diamine compounds disclosed in Japanese Unexamined Patent Application, First Publication No. H5-155841 may be mentioned. These compounds may be used alone or in combination of two or more types thereof. In addition, in some cases, a compound containing one active hydrogen which can react with isocyanate may be used in combination therewith.

As examples of the single active hydrogen compound having a tertiary nitrogen group reactive with an isocyanate group which can be used as an end stopper during the polyurethane polymerization used in the present invention, the following compounds may be mentioned. Amine compounds such as dimethylaminoethylamine, diethylaminoethylamine, dipropylaminoethylamine, N,N-diisopropylaminoethylamine, dimethylaminopropylamine, diethylaminopropylamine, dibutylaminopropylamine, dimethylaminoethoxypropylamine, diethanolaminopropylamine, N-aminoethylpiperidine, N-aminoethyl-4-pipecoline, N-aminopropylpiperidine, N-aminopropyl-2-pipecoline, N-aminopropylmorpholine, 4-aminomethyl-1-butylpiperidine, dimethylaminoethoxypropylamine, N-aminoethylpiperidine, N-aminoethyl-4-pipecoline, N-aminopropylpiperidine, N-aminopropyl-2-pipecoline, N-aminopropylmorpholine, 4-aminomethyl-1-butylpiperidine are exemplified. In addition, as examples of the alcohol compound having a tertiary nitrogen group and at the same time having a hydroxyl group which reacts with an isocyanate group, in a single molecular structure, mention may be made of diethylaminopropyl alcohol, diethylaminoisopropyl alcohol, dimethylaminoethyl alcohol, dipropylaminoethyl alcohol, dimethylaminoethoxypropyl alcohol and the like. As a single active hydrogen group reactive with an isocyanate group, a compound having an active amino group more quickly completes the reaction with the isocyanate group, as compared with a compound having an active hydroxyl group, and therefore, the compound having an active amino group is more preferable from the viewpoint of reduced crosslinking of the side reaction, and from the view point of elastic recovery and heat resistance of the polyurethane elastic fibers.

In addition to the aforementioned single active hydrogen compound, another single active hydrogen-containing compound which reacts with the following isocyanate group used at the time of polymerization reaction of polyurethane may be mixed and used. In this case, the obtained polyurethane polymer is subjected to spinning, the polyurethane elastic fibers of the present invention can be obtained.

As examples of these compounds, the following compounds can be mentioned.

Monoalcohols such as methanol, ethanol, 2-propanol, 2-methyl-2-propanol, 1-butanol, 2-ethyl-1-hexanol, and 3-methyl-1-butanol, monoalkylamines such as isopropylamine, n-butylamine, t-butylamine, and 2-ethylhexylamine, and dialkylamines such as diethylamine, dimethylamine, di-n-butylamine, di-t-butylamine, diisobutylamine, di-2-ethylhexylamine, and diisopropylamine. These compounds can be used alone or in combination. A monoalkylamine or a dialkylamine which is a monofunctional amine is more preferable as compared with a monoalcohol. In addition, a diethylamine is in particular, preferable from the view point of easiness of carrying out the amino exchange reaction between the terminal group of the polyurethane urea polymer (B) and the diamine compound (2) which can be used in the present invention.

As a method for producing a polyurethane urea using a diisocyanate compound, a high-molecular diol and an active hydrogen-containing compound, a known urethanization reaction technique can be adopted. In addition, the stoichiometric ratio of the various compounds used in the present invention is such that the sum of the hydroxyl groups of the high-molecular diol and the active hydrogen of the active hydrogen-containing compound with respect to the isocyanate group of the diisocyanate compound is 1.00 or more and less than 1.07 equivalents.

An example of a method for producing the raw material, the urethane urea polymer (B) in the present invention is as follows. An excessive equivalent of a diisocyanate is reacted with a polyol in advance to obtain a prepolymer having a terminal isocyanate group, and the obtained prepolymer is reacted with a bifunctional active hydrogen-containing compound, a single active hydrogen compound having a tertiary nitrogen group and/or a single active hydrogen-containing compound.

The specific viscosity ($\eta_{sp/c}$) of the polyurethane urea polymer (B) forming the polyurethane urea elastic fibers of the present invention preferably ranges from 1.1 to 3.5 dl/g. Within this range, elastic fibers having superior elastic recoverability can be obtained. Here, the specific viscosity ($\eta_{sp/c}$) is a value calculated by ($\eta/\eta_0 - 1$)/C in an N, N-dimethylacetamide (DMAc) solvent (wherein C is a solution viscosity of polymer 0.5 g/DMAC 99.5 g (0.5% by mass), $\eta$ is the number of seconds of falling in the dilute solution by the Ostwald viscometer, and $\eta_0$ is the number of seconds of falling in the only DMAc by the same viscometer as described above).

The process for producing the polyurethane urea elastic fibers of Embodiment 1 will be described in more detail.

(First Step)

<Mixing and Heating of Polyurethane Urea Polymer (B) and Diamino Compound>

In Embodiment 1, the diamino compound represented by the aforementioned general formula (2) is added in a ratio ranging from 0.01 to 15 parts by mass with respect to 100 parts by mass of the aforementioned polyurethane urea polymer (B), and then heated. Thereby, a polyurethane urea polymer (A) represented by general formula (1) described below, having a number average molecular weight calculated in terms of polystyrene ranging from 12,000 to 50,000, and having the tertiary nitrogen groups at the terminal groups, is produced.

[Chem. 6]

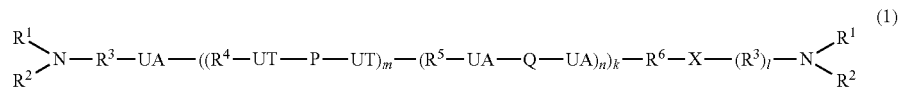

{wherein $R^1$ and $R^2$ are the same or different and represent a linear or branched alkyl group or hydroxyalkyl group having 1 to 10 carbon atoms, or $R^1$ and $R^2$ are bonded to form a heterocyclic group together with the nitrogen atom to which they are bonded, $R^3$ is a linear or branched alkylene group having 1 to 8 carbon atoms, an ethyleneoxy group having 1 to 5 repeating units or a propyleneoxy group having 1 to 5 repeating units, $R^4$ is a diisocyanate residue, X is a urethane bond or a urea bond, $R^5$ and $R^6$ are the same or different diisocyanate residue, P is a diol residue, Q is a diamine residue, UT is a urethane bond, UA is a urea bond, each of k, l, m and n is a positive number, either m or n may be 0, and 1 may be 0}.

By adding the aforementioned diamino compound (2) in a ratio ranging from 0.01 to 15 parts by mass with respect to 100 parts by mass of the solid content of the polyurethane urea polymer (B), the aforementioned diamino compound (2) is reacted to the moiety of the urea group of the main chain or the terminal group by means of an amino exchange reaction at the urea binding moiety of the polyurethane urea polymer (B). Thereby, the molecular weight-adjusted polyurethane urea polymer (A) having a number-average molecular weight in terms of polystyrene ranging from 12,000 to 50,000, and having the tertiary nitrogen groups at the terminal groups can be obtained. The more preferable amount of the diamino compound (2) added is in a ratio ranging from 1 to 10 parts by mass, and the still more preferable amount thereof is in a ratio ranging from 2 to 8 parts by mass, with respect to 100 parts by mass of the solid content of the polyurethane polymer (B).

The heating and stirring temperature at the time of mixing and heating the aforementioned polyurethane urea polymer (B) and the diamino compound according to Embodiment 1 in the presence of a solvent, preferably ranges from 50° C. to 150° C., and more preferably ranges from 70° C. to 100° C. When the heating and stirring temperature ranges 50° C. to 150° C., the desired polyurethane urea polymer (A) can be obtained without causing a side reaction or the like in a relatively short period of time. Therefore, this is preferable.

The period of time of heating and mixing the polyurethane urea polymer (B) and the diamino compound preferably ranges from 30 minutes to 40 hours. The period preferably ranges from 2 hours to 30 hours, and more preferably ranges from 15 hours to 25 hours. When the mixing period of time is within the range of from 30 minutes to 40 hours, the polyurethane urea polymer (A) having the desired molecular weight can be obtained at the specified mixing temperature. For this reason, this is preferable.

A mixing composition containing the polyurethane urea polymer (B) and the diamino compound may be used in the absence of a solvent or in a solvent. The mixing state of the polyurethane urea polymer (B) and the diamino compound makes the reaction more uniformly proceed, and for this reason, it is preferable to carry out the reaction in a solvent. As examples of suitable solvents, mention may be made of solvents inert to isocyanate groups, such as N,N-dimethylacetamide (DMAc), N,N-dimethylformamide (DMF), dimethylsulfoxide and the like. DMAc or DMF is usually used as a preferable solvent for producing polyurethane fibers. For this reason, it is particularly preferable to use DMAc or DMF also in the case of mixing with the diamino compound.

When the polyurethane urea polymer (A) is produced by using the same solvent as the solvent used for (B), the polyurethane urea polymer (A) can be directly mixed in the polyurethane urea polymer (B), and the mixture can be used as a spinning dope. For this reason, the production process can be made simple and easy.

Under the conditions mentioned above, the molecular weight of the polyurethane urea polymer (A) according to Embodiment 1 can be adjusted to the desired range.

(First Step)

The number average molecular weight of the polyurethane urea polymer (A) obtained under the aforementioned mixing and heating conditions is preferably adjusted to 12,000 to 50,000 calculated in terms of polystyrene (the measurement method is described in Examples). The number average molecular weight more preferably ranges from 15,000 to 45,000, and still more preferably ranges from 20,000 to 40,000. When the molecular weight of the polyurethane urea polymer (A) is in the range of from 12,000 to 50,000, the polyurethane elastic fibers obtained by spinning the spinning dope which contains the polyurethane urea polymer (A) having the molecular weight controlled as described above exhibit not only the improvements in dyeability, heat resistance, heat setting property and spinnability simultaneously, but also the suppression of scum formation and yarn breakage in the subsequent process, and in addition, the heat resistance is not lowered. For this reason, the power reduction of the fabric in the dyeing process does not occur.

It is necessary that the solid content of the polyurethane urea polymer (A) is contained in a ratio ranging from 0.01 to 20 parts by mass with respect to 100 parts by mass of the solid content of the other polyurethane urea polymer (B). If the amount is less than 0.01 parts, the effect is reduced. On the other hand, if the amount exceeds 20 parts by mass, the elastic properties of the polyurethane elastic fibers are deteriorated. The ratio preferably ranges from 0.1 to 15 parts by mass, and more preferably ranges from 1 to 10 parts by mass.

The reason why the polyurethane urea polymer (A) represented by the aforementioned general formula (1) is produced by using the diamino compound (2) according to Embodiment 1 is due to the amino exchange reaction caused by heating between the urea groups at the main chain and the terminal of the polymer contained in the polyurethane urea polymer (B) of Embodiment 1 and the primary amino group in the amino compound (2) mentioned above. As described above, when the amino exchange reaction occurs between the urea groups of the polyurethane urea polymer (B) and the primary amino group of the diamino compound (2), cleavage due to the amino exchange reaction also occurs on the main chain of the polyurethane urea polymer (B), and a so-called "medium molecular weight" polyurethane urea polymer (A) in which the tertiary nitrogen group in the diamino compound (2) is bonded to the terminal group of the polymer after cleavage is produced.

The produced polyurethane urea polymer (A) can secure a sufficient concentration of the tertiary nitrogen group due to the medium molecular weight thereof, and also has a reduced amount of a urea compound with a low molecular weight. For this reason, not only satisfactory dyeability can be obtained, but also entanglement with other polyurethane urea weight (B) at the molecular level can be carried out. Therefore, the scum formation difficultly occurs even during spinning and even in the after-processing step. However, the specific compound which has the tertiary nitrogen groups at the terminal groups and has a molecular weight of 300 or more and less than 2,000 as proposed in Japanese Unexamined Patent Application, First Publication No. 2014-095162 mentioned above corresponds to a urea compound having a low molecular weight in the aforementioned general formula (1) wherein k corresponds to 0, and has low affinity for the polyurethane urea polymer (B). For this reason, the scum formation occurs. In addition, even in Japanese Unexamined Patent Application, First Publication No. 2014-091891 unreacted diisocyanate as a raw material remains in the polyurethane (urea) polymer having the tertiary nitrogen groups at the terminal groups, which is obtained by a prepolymer preparation method by setting a lower molecular weight. For this reason, the low molecular weight urea compound in which k corresponds to 0 is inevitably contained, and therefore, the scum formation easily occurs. By means of the preparation process according to the present invention using the diamino compound (2) and the polyurethane urea (B), for the first time, it has become possible to reduce the amount of the compound with a low molecular weight in which k corresponds to 0.

(Second Step)

(Step of Preparing Spinning Dope)

This step is a step of preparing a spinning dope containing a solvent by adding a solid content of the aforementioned polyurethane urea polymer (A) in a ratio of 0.01 to 20 parts by mass with respect to 100 parts by mass of the solid content of the polyurethane urea polymer (B). The more preferable addition amount thereof ranges from 1 to 15 parts by mass.

When the addition amount of the polyurethane urea polymer (A) is within the specified range as described above, the maximum effects in Embodiment 1 can be exhibited.

The concentration of the solid content of the polyurethane urea polymer (A) and the polyurethane urea polymer (B) in combination is preferably 20% by mass or more and 50% by mass or less with respect to 100% by mass of the spinning dope, since yarn breakage does not occur at the time of high speed spinning of fine yarns, and therefore, this is preferable. The concentration more preferably ranges from 30 to 40% by mass.

The known stabilizers such as a heat stabilizer, an antioxidant, an ultraviolet inhibitor, a yellowing inhibitor, or a thermal discoloration inhibitor, for organic compounds or inorganic compounds can be added to the solution of polyurethane urea polymer obtained as described above, if desired. The polyurethane urea elastic fibers of the present invention may contain various well-known stabilizers for polyurethane, pigments and the like, if necessary, as long as the effects of the present invention are impaired.

For example, as examples of the phenolic antioxidant, mention may be made of 1,3,5-tris (4-t-butyl-3-hydroxy-2,6-dimethylbenzyl) isocyanurate, 3,9-bis [2-[3-[3-tert-butyl-4-hydroxy-5-methylphenyl]propionyloxy]-1,1-dimethylethyl]-2,4,8,10-tetraoxaspiro[5 •5]undecane, triethylene glycol-bis (3-t-butyl-4-hydroxy-5-methylphenyl) propionate, a hindered phenol compound having at least one hindered hydroxyphenyl group and having a molecular weight of about 300 or more, a polymer of p-cresol and divinylbenzene, a polymer of p-cresol and dicyclopentadiene, a polymer of p-chloromethylstyrene and p-cresol, and the like. Benzotriazole-based agents such as "Tinuvin" manufactured by Ciba Geigy AG, benzophenone-based agents, phosphorus-based agents such as "Sumilizer" P-16 manufactured by Sumitomo Chemical Co., Ltd., various types of hindered amine-based agents, inorganic pigments such as titanium oxide and carbon black, fluorine-based resin powder or silicone-based resin powder, metal soaps such as magnesium stearate, disinfectants containing silver, zinc or the compounds thereof, deodorants, lubricants such as silicone or mineral oil, various antistatic agents such as phosphoric acid-based one, betaine, barium sulfate, and cerium oxide, and the like, may be added, and in addition, they may be present by reacting with the polymer. In order to further improve the durability with respect to light and various types of nitrogen oxides and the like, a nitrogen oxide capturing agent such as HN-150 manufactured by Japan Finechem Company, Inc., a thermal oxidation stabilizer, a light stabilizer such as "SUMISOVE" 300 #622 manufactured by Sumitomo Chemical Industry Company Limited, and the like are preferably contained.

(Third Step)

(Step of Spinning Polyurethane Urea Elastic Fibers)

In this step, the polyurethane urea elastic fibers are produced by using the aforementioned polyurethane urea spinning dope.

As a spinning method for spinning polyurethane elastic fibers, a melt spinning method, a wet spinning method, and a dry spinning method are generally known. In the present invention, the spinning method is preferably a dry spinning method by which fine fibers can be stably produced during high-speed spinning.

When the polyurethane elastic fiber of the present invention after spinning is wound into a package, the fiber can be treated with a fiber treatment agent which contains an oil component in which a polyalkylsiloxane having a kinematic viscosity at 25° C. ranging from 5 to 50 centistokes and a mineral oil having a kinematic viscosity at 25° C. ranging from 30 to 70 centistokes are mixed in a ratio (polyalkylsiloxane/mineral oil) ranging from 100/0 to 50/50, a fatty acid metal salt, a polycarboxylic acid-based copolymer, and a polyether-modified silicone.

More specifically, when the polyurethane elastic fibers of the present invention is spun and then wound into a package, the yarn can be treated with the fiber treatment agent which contains: the oil component containing a polyalkylsiloxane having a kinematic viscosity at 25° C. ranging from 5 to 50 centistokes and a mineral oil having a kinematic viscosity at 25° C. ranging from 30 to 70 centistokes in a ratio ranging from 100/0 to 50/50; the fatty acid metal salt having 10 to 30 carbon atoms in an amount ranging from 0.1 to 10 parts by mass; the polycarboxylic acid-based copolymer in an amount ranging from 0.001 to 5 parts by mass; and the polyether-modified silicone in an amount ranging from 0.00001 to 5 parts by mass, with respect to 100 parts by mass of the oil component mentioned above. The fiber treatment agent may further contain a modified silicone, a phosphoric acid-based compound, mineral fine particles such as talc, silica, or colloidal alumina, a higher aliphatic alcohol, paraffin, a polyethylene, a solid wax at room temperature, a coloring agent, rosin, pigment, carbon black and the like, within the range which does not impair the effects of the present invention.

The method for preparing the fiber treatment agent formed by the aforementioned mixed composition can be uniformly dispersed by a known method with a ball mill apparatus, a bead mill apparatus, or a homomixer apparatus. It is preferable to uniformly disperse with a wet bead mill.

The amount of the fiber treatment agent to be adhered to the polyurethane elastic fibers preferably ranges from 0.5 to 10 parts by mass, more preferably ranges from 2 to 8 parts by mass, with respect to 100 parts by mass of the polyurethane elastic fibers to which the treatment agent has not been applied yet.

A method for producing a polyurethane elastic fiber according to Embodiment 2 contains the steps of:

(1) producing the polyurethane urea polymer (A) mentioned above;

(2) preparing a spinning dope containing a solvent and a polymer of a compound having an anionic functional group by adding the solid content of the aforementioned polyurethane urea polymer (A) in a ratio ranging from 0.01 to 20 parts by mass with respect to 100 parts by mass of the solid content of the polyurethane urea polymer (B) mentioned above; and (3) spinning a polyurethane elastic fiber using the spinning dope mentioned above.

First, the polyurethane urea polymer (A) used in Embodiment 2 is described.

The polyurethane urea polymer (A) used in the present embodiment is a polyurethane urea polymer represented by the general formula (1) mentioned above, which has a number average molecular weight ranging from 12,000 to 50,000 and has the tertiary nitrogen groups in the terminal groups.

In addition, by combining the polyurethane urea polymer (A) according to Embodiment 2 with a polymer of a compound having an anionic functional group, which will be described later, the dyeability and thermal properties of the polyurethane elastic fibers, in particular, color fastness, which are also objects of Embodiment 2, are simultaneously improved, and the clumping of the inorganic functional agent can be suppressed, and the occurrence of scum formation and yarn breakage during spinning and the after-processing step can be suppressed.

Next, the polyurethane polymer (B) used in Embodiment 2 is described.

The polyurethane polymer (B) is obtained by a known method in which an active hydrogen-containing compound is reacted with a prepolymer obtained by reacting a high-molecular diol and a diisocyanate.

As examples of the high-molecular diol, mention may be made of polyester diol, polycarbonate diol, polyether diol, and the like. A polyether diol is preferable, and a polyalkylene ether diol in which one type or two or more types of linear or branched alkylene groups having 2 to 10 carbon atoms are ether-bonded is particularly preferable.

As the polyalkylene ether diol, a homopolymerized or copolymerized polyalkylene ether diol is preferable. The number average molecular weight (Mn) of the polyalkylene ether diol used in Embodiment 2 preferably ranges from 500 to 6,000, and more preferably ranges from 1,000 to 3,000. If the Mn is less than 500, the elastic recovery property is degraded. On the other hand, if the Mn is more than 6,000, the spinnability is impaired.

In the copolymerized polyalkylene ether diol, the alkylene group is ether-bonded in a block or random manner. As compared with PTMG (polytetramethylene ether glycol), which is a homopolymerized polyalkylene ether diol widely used as a raw material of the polyurethane elastic fibers, in the case of the oily urethane elastic fibers using a copolymerized polyalkylene ether diol formed from two or more types of alkylene groups, the diol component occupying 65% to 85% by mass of the polyurethane component is amorphous. For this reason, the dye easily permeates into the polyurethane polymer, and the diamino compound and the dye are efficiently bonded to each other in the polyurethane elastic fiber. Therefore, the vivid color development with the better dyeability and better hue can be obtained.

In addition, as an advantage of using a copolymerized diol, the elastic function can be further improved, and for this reason, the polyurethane elastic fibers have the superior elastic function, that is, the increased elongation at break, the reduced stress fluctuation against strain upon elongation, the hysteresis loss with small stress upon elongation, and the like. Therefore, a pantyhose and an outerwear using the same become the textile products which have the superior elastic function, provide a superior sensation during wearing, and exhibit good aesthetic properties. Among the copolymerized polyalkylene ether diols, the copolymerized polyalkylene ether diol containing a butylene group, that is, a tetramethylene ether unit is preferable from the viewpoints of water resistance, light resistance, abrasion resistance, elastic function and the like of the resulting polyurethane elastic fibers. Furthermore, the copolymerized polyalkylene ether diol containing a combination of a butylene group, that is, a tetramethylene ether unit and a 2,2-dimethylpropylene group, that is, a neopentylene ether unit, or a combination of a tetramethylene ether unit and a 2-methylbutylene group is preferable.

The alkylene ether unit other than the tetramethylene group is preferably contained in an amount of 4% by mol or more and 85% by mol or less. If the amount of the alkylene ether unit is less than 4% by mol, the effect of improving the elastic function of the polyurethane elastic fibers is reduced. On the other hand, if the amount exceeds 85% by mol, the strength or elongation of the elastic fibers is largely decreased.

As examples of the diisocyanate mentioned above, mention may be made of known aliphatic, alicyclic or aromatic organic diisocyanates having two isocyanate groups in the molecule. As specific examples thereof, mention may be made of organic diisocyanates such as 4,4'-diphenylmethane diisocyanate, 2,4- or 2,6-tolylene diisocyanate, p-phenylene diisocyanate, 1,5-naphthalene diisocyanate, xylylene diisocyanate, hexamethylene diisocyanate, isophorone diisocyanate, and 4,4'-dicyclohexylmethane diisocyanate. 4,4'-diphenylmethane diisocyanate is preferable. In addition, as the organic diisocyanate, a compound having a blocked isocyanate group which will be converted into a free isocyanate group may be used.

As the active hydrogen-containing compound which reacts with the isocyanate group, it is possible to use a conventional chain extender in polyurethane, that is, a compound having a low molecular weight of 500 or less and containing at least 2 hydrogen atoms, which can react with isocyanate to form a urea group or a urethane group. As specific examples thereof, mention may be made of diamines such as ethylenediamine, propylenediamine, tolylenediamine, m-xylylenediamine, 1,3-diaminocyclohexane, isophoronediamine, hydrazine, 4,4'-diaminodiphenylmethane, dihydrazide, and piperazine, diamine compounds disclosed in Japanese Unexamined Patent Application, First Publication No. H5-155841, diols such as ethylene glycol, propylene glycol, and 1,4-butanediol, and the like. As the preferable examples, ethylenediamine, 1,2-propylenediamine, and the diamine compounds disclosed in Japanese Unexamined Patent Application, First Publication No. H5-155841 may be mentioned. These compounds may be used alone or in combination of two or more types thereof. In addition, in some cases, a compound containing one active hydrogen which can react with isocyanate may be used in combination therewith.

As a method for producing a polyurethane urea using a diisocyanate compound, a high-molecular diol and an active hydrogen-containing compound, a known urethanization reaction technique can be adopted. In addition, the stoichiometric ratio of each of the compounds used in Embodiment 2 of the present invention is preferably set such that the sum of the hydroxyl groups of the high-molecular diol and the active hydrogen of the active hydrogen-containing compound with respect to the isocyanate group of the diisocyanate compound is 1.00 or more but less than 1.07 equivalents.

Among the polyurethane urea polymers (A) according to Embodiment 2, a polyurethane urea polymer (A) according to a more preferable embodiment is described.

In Embodiment 2, the more preferable polyurethane urea polymer (A) is a polyurethane urea polymer having a number average molecular weight ranging from 12,000 to 50,000 in which UA and X in the general formula (1) mentioned above are urea bonds. For example, the polyurethane polymer (B) mentioned above is reacted with a diamino compound having a primary nitrogen group and a tertiary nitrogen group in the molecule at the same time, as represented by the following general formula (2), and thereby, the polymer (A) having a molecular weight controlled to 12,000 to 50,000 and having the tertiary nitrogen groups at the terminal groups can be obtained.

As examples of the diamino compound used in this embodiment, mention may be made of the amine compounds represented by the following general formula (2):

[Chem. 7]

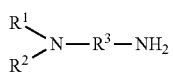

(2)

{wherein $R^1$ and $R^2$ are the same or different and represent a linear or branched alkyl group or hydroxyalkyl group having 1 to 10 carbon atoms, or $R^1$ and $R^2$ are bonded to form a heterocyclic group together with the nitrogen atom to which they are bonded, and $R^3$ is a linear or branched alkylene group having 1 to 8 carbon atoms, an ethyleneoxy group having 1 to 5 repeating units or a propyleneoxy group having 1 to 5 repeating units.}

That is, the diamino compound is a single active hydrogen compound having a tertiary nitrogen group in the molecule, and having a primary nitrogen group which allows the molecular weight of the polyurethane urea polymer (A) to be controlled by an amino exchange reaction, in the molecule at the same time. As specific examples thereof, the following compounds can be mentioned. For example, amine compounds such as dimethylaminoethylamine, diethylaminoethylamine, dipropylaminoethylamine, N,N-diisopropylaminoethylamine, dimethylaminopropylamine, diethylaminopropylamine, dibutylaminopropylamine, dimethylaminoethoxypropylamine, diethanolaminopropylamine, N-aminoethylpiperidine, N-aminoethyl-4-pipecoline, N-aminopropylpiperidine, N-aminopropyl-2-pipecoline, N-aminopropylmorpholine, 4-aminomethyl-1-butylpiperidine, dimethylaminoethoxypropylamine, N-aminoethylpiperidine, N-aminoethyl-4-pipecoline, N-aminopropylpiperidine, N-aminopropyl-2-pipecoline, N-aminopropylmorpholine, and 4-aminomethyl-1-butylpiperidine may be mentioned.

Among these, diethylaminopropylamine and dibutylaminopropylamine are more preferable.

<Mixing and Heating of Polyurethane Urea Polymer (B) and Diamino Compound>

The more preferable polyurethane urea polymer (A) according to Embodiment 2 is a polyurethane urea polymer represented by the following general formula (1), wherein UA and X are urea bonds, which can be obtained by adding the diamino compound (2) mentioned above in a ratio ranging from 0.01 to 15 parts by mass with respect to 100 parts by mass of the solid content of the aforementioned polyurethane urea polymer (B), and then heating.

(DMF), dimethylsulfoxide and the like. DMAc or DMF is usually used as a preferable solvent for producing polyurethane fibers. For this reason, it is particularly preferable to use DMAc or DMF also at the time of heating and mixing the polyurethane polymer (B) and the diamino compound.

When the polyurethane urea polymer (A) mentioned above is produced by using DMAc as the solvent, the mixture can be directly mixed in a spinning dope. For this reason, the production process can be made simple and easy.

The molecular weight of the polyurethane urea polymer (A) according to Embodiment 2 can be adjusted to the desired range under the conditions mentioned above.

The molecular weight of the polyurethane urea polymer (A) obtained under the aforementioned mixing and heating conditions is preferably adjusted so that the number average molecular weight calculated in terms of polystyrene ranges from 12,000 to 50,000 (the measurement method is described in Examples). The number average molecular weight more preferably ranges from 15,000 to 45,000, and still more preferably ranges from 20,000 to 40,000. When the molecular weight of the polyurethane urea polymer is in the range of from 12,000 to 50,000, the polyurethane elastic fibers obtained by spinning the spinning dope which contains the polyurethane urea polymer (A) having the molecular weight controlled as described above, exhibit not only the

[Chem. 8]

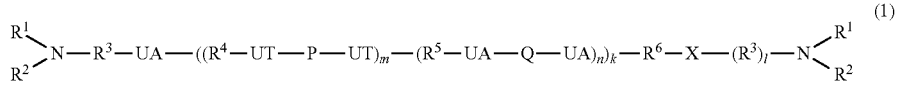

When the aforementioned diamino compound (2) is present within the range, the molecular weight calculated in terms of polystyrene of the aforementioned polyurethane urea polymer can be adjusted to 12,000 to 50,000. The effects can be exhibited without adverse effects to the polyurethane elastic fibers. The more preferable amount of the diamino compound mentioned above ranges from 0.5 to 6 parts by mass, and the still more preferable amount thereof ranges from 1 to 5 parts by mass, with respect to 100 parts by mass of the solid content of the polyurethane polymer (B).

The heating temperature at the time of mixing and heating the aforementioned polyurethane polymer (B) and the diamino compound (2) according to Embodiment 2 in the presence of a solvent preferably ranges from 50° C. to 150° C., and more preferably ranges from 70° C. to 100° C. When the heating temperature ranges 50° C. to 150° C., the desired molecular weight of the polyurethane urea polymer can be obtained in a relatively short period of time. Therefore, it is preferable.

The mixing period of time of mixing the polyurethane urea polymer (B) and the diamino compound preferably ranges from 30 minutes to 30 hours. The period preferably ranges from 1 hour to 15 hours. When the mixing period of time is within the range of from 30 minutes to 30 hours, a polyurethane urea polymer (A) having the desired molecular weight can be obtained at the specified mixing temperature. For this reason, it is preferable.

The heating and mixing of the polyurethane polymer (B) and the diamino compound is preferably carried out in a solvent. As examples of suitable solvents, mention may be made of solvents inert to isocyanate groups, such as N,N-dimethylacetamide (DMAc), N,N-dimethylformamide improvements in the dyeability, heat resistance, heat setting property and spinnability simultaneously, but also the suppression of scum formation and yarn breakage in the subsequent process. For this reason, the power reduction during spinning and in the fabric processing does not occur.

In Embodiment 2, it is necessary that the solid content of the polyurethane urea polymer (A) is contained in a ratio ranging from 0.01 to 20 parts by mass with respect to 100 parts by mass of the solid content of the other polyurethane urea polymer (B). If the amount is less than 0.01 parts by mass, the effect is reduced. On the other hand, if the amount exceeds 20 parts by mass, the elastic properties of the polyurethane elastic fibers are deteriorated. The ratio preferably ranges from 0.1 to 15 parts by mass, and more preferably ranges from 1 to 10 parts by mass.

In addition, by combining the polyurethane urea polymer (A) according to Embodiment 2 with a polymer of a compound having an anionic functional group described later, a spinning dope in which clumping of the inorganic functional agents such as titanium oxide and hydrotalcite is suppressed can be obtained. The polyurethane elastic fibers obtained by dry spinning with the spinning dope exhibit superior spinning stability productivity, and also have a good heat setting property without occurrence of scum formation. In addition, even more surprisingly, the polyurethane elastic fibers can exhibit synergistic effects to exhibit superior dyeability and superior color fastness.

The reason why the polyurethane urea polymer (A) represented by the aforementioned general formula (1) wherein UA and X are urea bonds, that is, the polyurethane urea polymer (A) having the tertiary nitrogen groups at the terminal groups is produced by the diamino compound (2) mentioned above, and the molecular weight thereof can be adjusted to the range, is due to the amino exchange reaction between the urea bond contained in the polyurethane urea polymer (B) in Embodiment 2 and the primary amino group in the diamino compound mentioned above.

As described above, when the amino exchange reaction occurs between the urea groups of the polyurethane urea polymer (B) and the diamino compound, cleavage of the main chain of the polyurethane polymer (B) occurs, and a so-called "medium molecular weight" polyurethane urea polymer in which the tertiary nitrogen group in the diamino compound is bonded to the terminal groups of the polymer after cleavage is produced. The polyurethane urea polymer (A) having the tertiary nitrogen groups at the terminal groups can tangle with the other polyurethane polymer at the molecular level due to the medium molecular weight thereof, and for this reason, the scum formation difficultly occurs even during spinning and even in the after-processing step. On the other hand, the urea compound which has the tertiary nitrogen groups at the terminal groups and has a molecular weight of 300 or more and less than 2,000 as proposed in Japanese Unexamined Patent Application, First Publication No. 2014-095162 mentioned above exhibits inferior affinity for the polyurethane polymer, and has an extremely reduced molecular weight. For this reason, the scum formation may easily occur. In addition, even in Japanese Unexamined Patent Application, First Publication No. 2014-091891, a polyurethane urea polymer having a specific structure having the tertiary nitrogen groups at the terminal groups, and having the molecular weight ranging from 2,000 to 100,000 is described. However, the unreacted diisocyanate compound as a raw material remains in the prepolymer, in the polyurethane urea polymer, which is obtained by a method via the prepolymer by setting a lower molecular weight. For this reason, a large amount of the low molecular weight urea compound which may cause the scum formation inevitably in view of the preparation steps.

However, by using a polymer of a compound having an anionic functional group in combination, it is possible to suppress the occurrence of scum formation even for the urea compound having a low molecular weight.

A more preferable preparation method is a preparation method of the aforementioned amino exchange reaction.

Next, a polymer of a compound having an anionic functional group (hereinafter referred to as an anionic polymer) according to Embodiment 2 is described.

For dyeing with a general acid dye, an anionic compound (for example, an aqueous solution of acetic acid) is added to the dyeing liquid to set the pH to about 4. However, in Embodiment 2, instead of this, the characteristic is exhibited, in which by previously adding an anionic polymer to the fibers to activate the alkali metal base present in the acidic dye, it is possible to improve dyeability of the polyurethane elastic fibers by occurring a strong adsorption reaction with the terminal tertiary nitrogen in the polyurethane polymer.

The functional group of the anionic polymer used in Embodiment 2 is selected from the group consisting of a carboxyl group, a sulfonic acid group, a nitro group and a phosphoric acid group. Among these, a carboxyl group is particularly preferable.

As the anionic polymer used in Embodiment 2, examples having a carboxyl group as a functional group is described in detail in Japanese Unexamined Patent Application, First Publication No. 2012-193259 filed by the present applicant. As specific examples of the anionic polymer, mention may be made of MALIALIM AKM-0531, AFB-0561, AFB-1521, AAB-0851, AEM 3511, AWS-0851 and the like manufactured by NOF CORPORATION. The preferred compounds are AKM-0531 and AAB-0851. In addition, as examples containing a sulfonic acid group, mention may be made of polymers described in Japanese Unexamined Patent Application, First Publication No. 2009-024320. These anionic polymers can be used alone or in combination.

The anionic polymer mentioned above is present preferably in 10 mmol/kg or more and 200 mmol/kg or less with respect to the polyurethane elastic fiber. The amount more preferably ranges from 20 mmol/kg to 180 mmol/kg, and further preferably ranges from 30 mmol/kg to 150 mmol/kg. By containing the anionic polymer in an amount of 10 mmol/kg or more and 200 mmol/kg or less with respect to the polyurethane elastic fibers, and combining with the polyurethane urea polymer (A) according to Embodiment 2, suppression of clumping of the inorganic functional agent, and the suppression of formation of scum of the urea compound having a low molecular weight can be remarkably improved. In addition, the dyeing properties of the fibers and the color fastness can be remarkably improved.

The reason why the color fastness of the polyurethane elastic fibers can be improved as described above may be presumed as follows: In Embodiment 2, the anionic polymer (in particular, the polycarboxylic acid-based copolymer compound) and the polyurethane urea polymer (A) in which the tertiary nitrogen-containing alkylamine is bonded at the terminals. On the other hand, in the case where the anionic polymer described in Japanese Unexamined Patent Application, First Publication No. 2009-024320 is used alone, the weakly basic dyeing sites present in the polyurethane polymer, per se, are blocked by the anionic functional groups, and for this reason, the acid dye cannot adsorb and bind to the polyurethane polymer, as described in the aforementioned [Background Art]. For this reason, the polyurethane polymer in which only the anionic polymer is added exhibits the reduced dyeability, as compared with the polyurethane polymer in which the anionic polymer is not added. On the other hand, in Embodiment 2, by using the polymer of a compound having an anionic functional group in combination with the tertiary nitrogen-containing polyurethane polymer (A), the metal salt (for example, sodium sulfonate) in the chemical structure which an acidic dye has is changed into a free anionic functional group (sulfonic acid group) by the anionic functional group. In addition, the conversion of the sulfonic acid group occurs inside the polyurethane polymer (B) constituting the polyurethane elastic fibers. For this reason, the acidic dye can be efficiently adsorbed and bound to the tertiary nitrogen-containing compound in the polyurethane polymer (B), and superior dyeing effects can be exhibited. The present invention is also advantageous from the viewpoint of cost of the waste liquid treatment and environmental pollution, since dyes are the expensive raw materials and some of the dyes are not used in the dye bath and are present in the waste liquid and discarded.

In addition, as described above, the polyurethane elastic fibers are inherently the flexible and sticky material. For this reason, yarn breakage easily occurs due to a frictional resistance with a roller or a guide in a spinning process, and finely powdered titanium oxide or the like is usually added to the fibers for amelioration thereof. In addition, in Japanese Unexamined Patent Application, First Publication No. 2012-193259, in order to improve the chlorine resistance of the polyurethane elastic fibers, attempts for amelioration thereof have been carried out by adding fine powder such as hydrotalcite to the fibers.

In Embodiment 2, it is preferable to contain a compound (referred to as an inorganic functional agent) that ameliorates yarn breakage and improves chlorine resistance of the polyurethane elastic fibers as described above.

As preferable examples of the inorganic functional agents, mention may be made of a metal salt of a fatty acid having 5 to 40 carbon atoms, wherein the metal in the metal salts is selected from the group consisting of magnesium, calcium, aluminum, and zinc; titanium oxide; zinc oxide; a metal composite salt of zinc oxide and silica; a hydrotalcite compound; a huntite compound; a solid solution of MgO and ZnO; a composite of silicon dioxide and zinc oxide; a composite salt of silicon dioxide and zinc oxide; a composite salt of silicon dioxide, zinc oxide, and alumina; porous synthetic silica; carbon black; a coloring agent; and a pigment.

The contained amount of the inorganic functional agent with respect to 100 parts by mass of the polyurethane polymer (B) preferably ranges from 0.1 to 10 parts by mass. When the amount of the inorganic functional agent contained is within this range, yarn breakage of the polyurethane elastic fibers does not occur and chlorine resistance of the fibers is improved.

However, such various inorganic functional agents exhibit poor affinity in the aforementioned amide-based solvent, and remarkably tend to be clumped. In particular, in the case of using only the polyurethane urea polymer (A) having the tertiary nitrogen groups at the terminals according to Embodiment 2, the formation of larger clumps is accelerated, and clogging of the filter and the various problems mentioned above are caused.

On the other hand, by using the polyurethane urea polymer (A) containing the tertiary nitrogen groups at the terminals in combination with the polymer of a compound having an anionic functional group according to Embodiment 2, the powder of the aforementioned inorganic functional agent does not cause clumping even in the state in which the powder is finely dispersed in an amide solvent, and can maintain a stable dispersion state.

In addition, it has been found that an unexpected and surprising effect of further improving dyeability at the same time can be exhibited.

The polyurethane urea polymer (A) obtained as described above may be added to the polyurethane polymer (B) and to the polymer of the compound having an anionic functional group, separately, or may be added to a mixture thereof prepared in advance. In addition, if desired, it is possible to add a smoothing agent, a heat stabilizer, an antioxidant, an ultraviolet inhibitor, an anti-yellowing agent, a thermal discoloration inhibitor, a bactericidal chlorine agent for use in pool, and the like, which are known organic compounds or inorganic compounds useful for polyurethane elastic fibers to prepare a spinning dope.

The spinning dope prepared by adding the additives as described above is molded into a fibrous form via a cylindrical spinneret by a conventionally known dry spinning method, melt spinning method or the like, or molded into a long flattened fibrous form by an extrusion molding method, and subsequently wound into a cylinder to obtain a polyurethane elastic fiber. A polyurethane elastic fiber obtained by a dry spinning method is preferable.

At this time, a known oil agent for polyurethane elastic fibers may be further adhered as an oil agent from the outside using an oiling device during spinning. As the oil agent components used herein, in addition to the ether-modified silicone, polyester-modified silicone, polyether-modified silicone, polyamino-modified silicone, polyorganosiloxane, mineral oil, talc, silica, mineral fine particles such as colloidal alumina, higher fatty acid metal salt powder such as magnesium stearate and calcium stearate, higher aliphatic carboxylic acid, higher aliphatic alcohol, waxes such as paraffin polyethylene and the like which are in the form of a solid wax at room temperature may be used in combination.

The polyurethane elastic fibers of Embodiment 2 may contain various stabilizers, pigments, and the like, as necessary, as long as they do not inhibit the effect of the present invention. For example, as light stabilizers, antioxidants and the like, benzotriazole-based agents such as "Tinuvin" manufactured by Ciba Geigy AG, benzophenone-based agents, phosphorus-based agents such as "Sumilizer" P-16 manufactured by Sumitomo Chemical Co., Ltd., various types of hindered amine-based agents, inorganic pigments such as titanium oxide and carbon black, fluorine-based resin powder or silicone-based resin powder, metal soaps such as magnesium stearate, disinfectants containing silver, zinc or the compounds thereof, deodorants, lubricants such as silicone or mineral oil, various antistatic agents such as phosphoric acid-based one, betaine, barium sulfate, and cerium oxide, and the like, may be added, and in addition, they may be present by reacting with the polymer. In order to further improve the durability with respect to light and various types of nitrogen oxides and the like, a nitrogen oxide capturing agent such as HN-150 manufactured by Japan Finechem Company, Inc., a thermal oxidation stabilizer, a light stabilizer such as "SUMISOVE" 300 #622 manufactured by Sumitomo Chemical Industry Company Limited, and the like are preferably contained.

For practical use, the polyurethane elastic fibers obtained by the production method of the present invention may be used as they are as bare yarns, and may also be used as coated elastic fibers by coating the polyurethane elastic fivers with conventionally known fibers that are other fibers such as polyamide fibers, wool, cotton, regenerated fibers, polyester fibers, or cellulose fibers. In particular, it is preferable to use the polyurethane elastic fibers in combination with a fiber material selected from the group consisting of nylon, ester, acryl, natural fibers and cellulose derivatives.

The polyurethane elastic fibers obtained by the production method of the present invention can be used in foundations, garters, rib tops, corsets, bandage for surgery, cords, woven fabrics, swimsuits of knitted fabrics, and the like. In particular, the fibers are preferably used in fiber products selected from the group consisting of inner wear, outer wear, legging, sportswear, jeans wear, swimsuit and sanitary materials.

In the case of dyeing the polyurethane elastic fibers obtained by the preparation method of the present invention, the same method as the usual method for dyeing synthetic fibers or natural fibers may be used. That is, a dyeing method such as a dip dyeing method, a pad steaming method, a pad thermofixing method, a textile printing method and a spraying method can be applied. As a dyeing machine, a usual dyeing machine such as a liquid flow dyeing machine, a winch dyeing machine and an air flow dyeing machine can be used.

EXAMPLES

Hereinafter, the present invention is described in detail with reference to Examples. It should be understood that the present invention is not limited thereto. Various evaluations were carried out according to the methods described below.

(1) Example of Production of Polyurethane Elastic Fibers

A spinning dope of the Example described below was defoamed. Subsequently, the spinning dope was extruded from fine pores of 16 spinnerets (each spinneret having 4 fine pores) to hot air at about 230° C. to evaporate the DMAc solvent. The dried yarn was false-twisted, and passed through a godet roller, and then an oil agent containing dimethylsilicone as a main component was applied thereto on an oiling roller. The yarn was wound around a paper tube at a speed of 750 m/min, and thereby, polyurethane elastic fibers of 44 dt/4 filaments were obtained. Results of various evaluations using the obtained polyurethane elastic fibers were shown in Table 2 and Table 5. The polyurethane elastic fibers thus produced were subjected to the measurement by using a tensile tester of a method for measuring load extension property at breakage (UTM-3-100 model, manufactured by Orientec Co., Ltd.) at 20° C. and under 65% RH atmosphere, with a sample fiber length of 5 cm and at a strain rate of 1000% for 1 minute. The obtained load-extension property at breakage exhibited good physical properties.

(2) Evaluation of Dyeability of Polyurethane Elastic Fiber

A 2-way tricot knitted fabric was used for dyeability evaluation. That is, nylon fiber of 33 dt/10 f was used for the front reed, the polyurethane elastic fiber of 44 dt of the present Example or the Comparative Example were used for the middle reed and the back reed, and the 2-way tricot knitted fabric was formed, in which the structure of the front reed was set to 10/23, the structure of the middle reed was set to 10/01, and the structure of the back reed was set to 12/10. The mixing ratio of the polyurethane elastic fiber of this fabric was 35%, and the fabric was put into a continuous refiner in a spread fabric state. At this time, the continuous refiner having four liquid tanks was used, in which the temperatures of the tanks were sequentially set at 20° C., 50° C., 70° C., and 90° C., so that the temperature of the tank which the fabric passed was sequentially changed, and 2 g/L of a refining agent (Score roll FC-250, manufactured by Kao Corporation) was added to each of the liquid tanks. The fabric after passing through the continuous refiner was passed through a bath for washing with water, and was subsequently dehydrated with a mangle, and preset thereof was carried out for 45 seconds at 190° C. with a pin tenter.

Subsequently, the fabric was placed in a jet dyeing machine, and 2 g/L of a refining agent (Score roll FC-250, manufactured by Kao Corporation) was added also in the liquid for refining. Thereby, refining was carried out in an acidic bath for 20 minutes at 70° C. After draining, rinsing, and again adding water thereto, the black acidic dye adjusted to pH 4 was added thereto, and dyeing was carried out for 60 minutes at 95° C.

Thereafter, rinsing was carried out and after a fixing treatment (natural tannin S 6% owf, tartar emetic L 3% owf, treatment for 40 minutes at 80° C.), the fabric was taken out from the dyeing machine. A processing with a soft resin was carried out, and a finishing setting was further carried out with a pin tenter at 170° C.

The dyeability in the case where the fabric was dyed in black was judged according to the following criteria.
Grade 5 Dark black,
Grade 4 Black,
Grade 3 Gray black,
Grade 2 Gray,
Grade 1 Light gray.

(3) Color Fastness to Washing and Laundering of Fabric

Evaluation was carried out based on JIS L0844 change in color.

A detergent used therein was 2 g/L of the detergent, of which the product name was "Attack", manufactured by Kao Corporation. The fabric was washed for 30 minutes under the condition of the washing liquid temperature of 80° C., subsequently rinsed with running water for 30 minutes, subsequently dehydrated, and subsequently dried for 24 hours at room temperature (20° C., 65% RH). The change in hue of the fabric was measured.

Change in hue ($\Delta$ grade)=(Grade before washing of the fabric)−(Grade after washing of the fabric)

As the grade before washing of the fabric is larger and the numerical value of $\Delta$ grade is smaller, the change in color is reduced, and the dyeability and fastness are better.

(4) Color Fastness after Dry Cleaning of Fabric

Evaluation was carried out according to JIS L 0860.

In the polyurethane elastic fiber of the present embodiment, it is preferable that the liquid contamination is the third grade or higher in the case of carrying out a dry cleaning test of the dyed fabric with disperse dye. In the case of less than the third grade in the liquid contamination evaluation of the dry cleaning test, there is a possibility that with respect to a fiber material obtained by dyeing, with the disperse dye, a mixed fabric of the polyurethane elastic fiber and the fiber dyeable with a disperse dye, satisfactory dry-cleaning fastness cannot be obtained.

[4-1] Preparation of Knitted Fabric of Bare Polyurethane Elastic Fiber for Evaluation Test Using a circular knitting machine (CR-C model, manufactured by Koike Machinery Co., Ltd.), 1.2 g of a bare polyurethane elastic fiber knitted fabric which was made by knitting with polyurethane elastic fibers was weighed, the surface of a bare knitted fabric made of polyester fiber in an amount of 4.8 g was set together with the surface of the polyurethane elastic fiber knitted fabric to fasten them. The fastened fabrics were placed in a stainless steel container, and dyed with C. I. Dye Disperse Blue 167 (benzene azo-based disperse dye) in an amount of 5% owf in a bath ratio of 1:50, at pH 5.0, at 130° C. for 30 minutes. The dyed polyurethane elastic fiber and polyester fiber were subjected to a reduction cleaning treatment with 1.6 g/l of hydrosulfite and 1.6 g/l of caustic soda at a bath ratio of 1:50 for 20 minutes at 80° C. The obtained bare knitted fabric of polyurethane elastic fiber was washed with water, air-dried and used for evaluation.

[4-2] Preparation of Polyurethane Elastic Fiber/Polyester Fiber Mixed Fabric for Evaluation Test 55 dtex/24 filaments of polyester fibers formed from polyurethane elastic fibers and polyethylene terephthalate were extruded so that the mixing ratio of the polyurethane elastic fibers was 20%, and thereby, 6 courses satin net knitted fabric was obtained under the common knitting conditions. The mixed fabric mentioned above was dyed by using C. I. Disperse Blue 167 (benzene azo-based disperse dye) in an amount of 5% owf, at a bath ratio of 1:50, at pH 5.0, for 30 minutes at 130° C. Subsequently, the dyed fabric was subjected to a reduction cleaning treatment using 1.6 g/l of hydrosulfite and 1.6 g/l of caustic soda at a bath ratio of 1:50, for 20 minutes at 80° C. The dyed interknitted fabric of the polyurethane elastic fibers and the polyester fibers obtained was washed with water, air-dried and used for evaluation.

[4-3] Contamination of Dry Cleaning Liquid

A dry cleaning test was carried out in accordance with JIS L 0860, 8 ml of the dirty liquid after the dry cleaning test was taken in a porcelain container (20 mm×40 mm×10 mm), and was compared with the dry cleaning liquid based on the gray scale for contamination with respect to the degree of the contamination of the liquid, and the degree of the color fading was judged.

(5) Evaluation of Spinning Stability

The spinning dope produced according to the method described in the Examples described below was spun for 30 hours by the method mentioned above and the number of yarn breakage (times/hour) was measured. The productivity is more stable as the yarn breakage count is smaller.

(6) Heat Cut in Seconds

The test yarn having an initial length of 14 cm was subjected to 50% elongation to have 21 cm, and then pressed against a cylindrical heat body filled with a silicone oil, the cylindrical heat body having a diameter of 6 cm and having the surface temperature controlled at 190° C. (the yarn contact portion was 1 cm). The period in seconds from the starting of contact until the disconnection was measured. As the period in seconds is longer, the heat resistance is increased. If the heat resistance is low, defects of pinholes in the fabric due to yarn breakage easily occur in the heat setting and dyeing steps during processing the fabric.

(7) Method for Measuring Heat Setting Ratio

The heat setting ratio was obtained by the measurements and the mathematical expression described below. Elastic yarn in a tense-free and straight state, which had a length of Ld 0 was extended to a length of 2.0 times, and fixed. Subsequently, the extended elastic yarn was passed through a tenter box adjusted to 185±1° C., as it was. The period of passing the tenter box was set to 30 seconds, and the yarn was immediately taken out, and twisted with a length equal to or less than Ld 0 to relax enough, and allowed to stand for 16 hours at room temperature. Again, the elastic yarn was set to be in a tense-free and straight state, and the length at that time was set to Ld 1. The setting ratio was defined by the mathematical expression described below. As the heat setting ratio is increased, the better dimensional stability is exhibited when cloth products are repeatedly worn.

Heat setting ratio (%)=[($Ld$ 1–$Ld$ 0)/$Ld$ 0]×100

(8-1) Evaluation Method of Scum (Yarn Scum)

Evaluation of the scum (yarn scum) of Examples 1 to 6 and Comparative Examples 1 to 4 was carried out in accordance with the following method.

After 400 g of an elastic fiber of 40 denier/5 filament were wound onto a paper tube and allowed to stand under an atmosphere of 40° C. and 65% RH for 35 days, the paper tube was placed on a matte roller and while rotating the roller, the elastic fiber was sent out at 40 m/min of a speed of the roller surface. The delivered elastic fiber was wound on a matte roller having the same diameter as described above, which was set at a distance of 50 cm. A razor blade was set at an intermediate point of 25 cm from the elastic yarn sent out so as to have a yarn angle of 115 degrees, and the surface speed on the roller for winding up was set at 70 m/min. After the elastic fiber was allowed to run on the razor blade for 1 hour, the amount of white scum adhered to the razor blade (NT-L type blade, product number L-300, manufactured by NT Incorporated) was visually observed to judge for grade 1 to grade 5. In the case of observing a large amount of scum generated, there may be a problem that the frictional resistance to the knitting needle and the guide increases at the time of processing the fabric, and the quality of the knitted fabric deteriorates.

Grade 5: No scum adhesion on the razor blade.
Grade 4: There is only a slight scum adhesion on the razor blade.
Grade 3: There is a scum adhesion on the razor blade.
Grade 2: There is a slightly increased amount of a scum adhesion on the razor blade.
Grade 1: There is a large amount of a scum adhesion on the razor blade.

(8-2) Scum Evaluation Method

The scum (yarn scum) evaluation of Examples 7 to 14 and Comparative Examples 5 to 14 was carried out according to the following method.

The elastic fiber of 44 denier/4 filaments was allowed to stand under an atmosphere of 45° C. and 65% RH for 30 days. A paper tube was placed on a matte roller and while rotating the roller, the elastic fiber was sent out at 40 m/min of a speed of the roller surface. The delivered elastic fiber was wound on a matte roller having the same diameter as described above, which was set at a distance of 50 cm. A razor blade was set at an intermediate point of 25 cm from the elastic yarn sent out so as to have a yarn angle of 115 degrees, and the surface speed on the roller for winding up was set at 70 m/min. After the elastic fiber was allowed to run on the razor blade for 1 hour, the amount of white scum adhered to the razor blade (NT-L type blade, product number L-300, manufactured by ET Incorporated) was visually observed to judge for grade 1 to grade 5. In the case of observing a large amount of scum generated, there may be a problem that the frictional resistance to the knitting needle and the guide increases at the time of processing the fabric, and the quality of the knitted fabric deteriorates.

Grade 5: No scum adhesion on the razor blade.
Grade 4: There is only a slight scum adhesion on the razor blade.
Grade 3: There is a scum adhesion on the razor blade.
Grade 2: There is a slightly increased amount of a scum adhesion on the razor blade.
Grade 1: There is a large amount of a scum adhesion on the razor blade.

(9) Measurement of Molecular Weight

The number average molecular weight of the polyurethane urea polymer in the Examples, such as polyurethane urea polymer (B) was measured as a molecular weight calculated in terms of polystyrene under the following measurement conditions.

Sample concentration: 0.1% by mass (DMF solution)
Injection volume: 50 µl
Feed pump: LC-20AD manufactured by Shimadzu Corporation
Column oven: CTO-20 A manufactured by Shimadzu Corporation
Detector: SPD-M 20A manufactured by Shimadzu Corporation
Eluent: DMF
Flow rate: 1 ml/min
Column temperature: 40° C.
Column: Shodex GPC KD-804+KD-803

(10) Analysis According to Infrared Absorption Spectrum Method

Analyzer: IR Affinity-IS model
Detector: Miracle 10
Sample stage: ATR prism plate (diamond/ZnSe)

Preparation Example 1

Preparation of Polyurethane Urea Polymer (B) Solution 400 g of polytetramethylene ether diol having a number average molecular weight of 1800 and 91.7 g of 4,4'-diphenylmethane diisocyanate were reacted while stirring under a dry nitrogen atmosphere for 3 hours at 80° C. Thereby, a urethane prepolymer, the terminals of which were capped with isocyanate was obtained. The reaction product was cooled to room temperature. Subsequently, 720 g of N,N-dimethylacetamide (hereinafter abbreviated as DMAc) was added thereto to dissolve the reaction product. Thereby, a urethane prepolymer solution was prepared. On the other hand, 8.11 g of ethylenediamine and 1.37 g of diethylamine were dissolved in 390 g of DMAc and the solution was added to the prepolymer solution mentioned above under vigorous stirring at room temperature. Thereby, a solution of a polyurethane urea polymer (B) having a viscosity of 360 Pa·s (30° C.) (solid content concentration: 31.1% by mass) was obtained.

Figure 2:
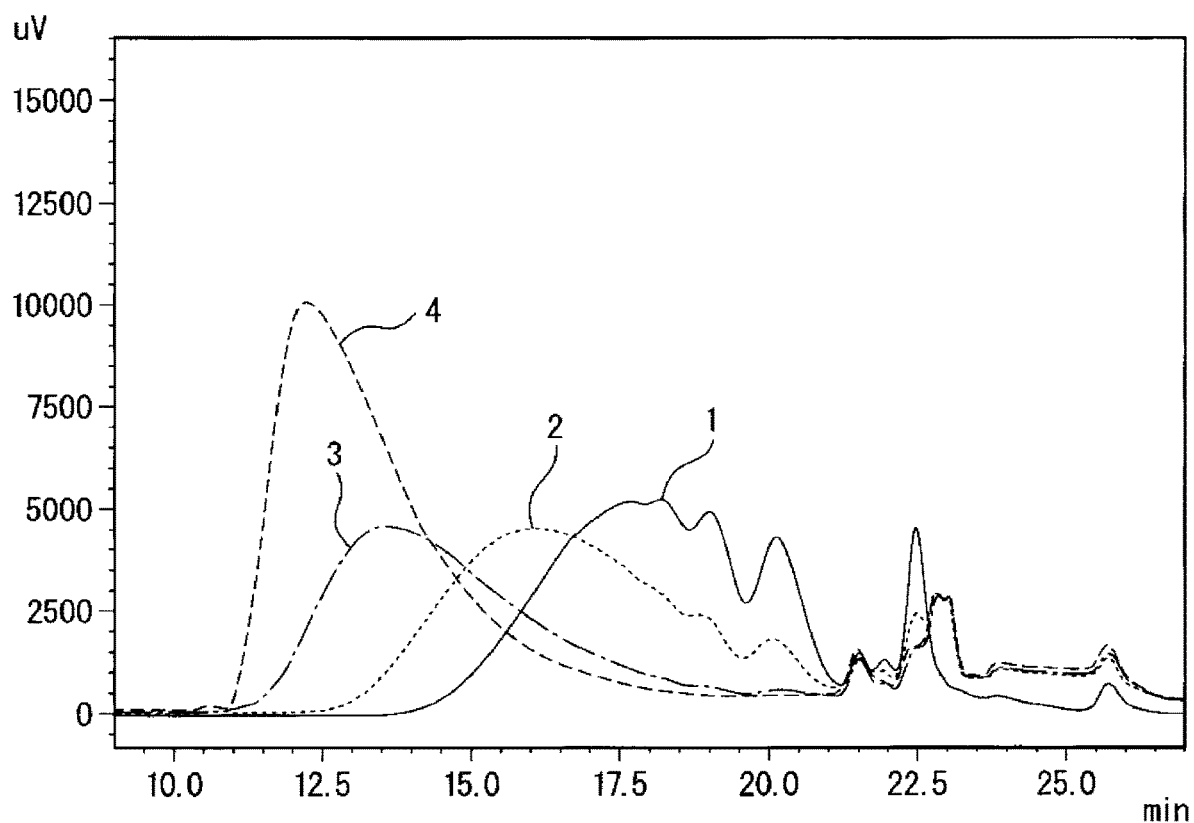
FIG. 2 is a graph showing GPC chromatograms of an N-2 compound (reference numeral 1), and an N-4 compound (reference numeral 2), produced in the Examples, Comparative Example 4 (reference numeral 3) and a polyurethane urea polymer (B) (reference numeral 4).

In addition, a GPC chromatogram of the polyurethane urea polymer (B) (reference numeral 4) was shown in FIG. 2. The molecular weight calculated in terms of polystyrene was 142,800.

Examples 1 to 6

(Preparation of Urethane Urea Polymer (A) Having Tertiary Nitrogen Groups at Terminals)

To 300 g of the polyurethane urea (B) solution prepared in Preparation Example 1, a solution obtained by dissolving 2.8 g of diethylaminopropylamine (an amount equivalent to 3 parts by mass based on 100 parts by mass of the solid content of the aforementioned (B)) in 120 g of DMAc was added. The mixture was stirred and mixed so as to be homogeneous, and subsequently, the temperature was gradually increased to 100° C. While the temperature was maintained at 100° C., the mixture was stirred and heated for 20 hours. The mixture was cooled to room temperature, and thereby, a polyurethane urea polymer (A) having the tertiary nitrogen groups at terminals which had a viscosity of 52 mPa·s/25° C. was prepared.

Polyurethane urea polymers (A) having the tertiary nitrogen groups at the terminals were prepared with the terminal tertiary nitrogen-containing alkylamine compounds shown in Table 1 in the same manner as that described above.

An IR chart of N-1 among the prepared polyurethane urea polymers (A) was shown in FIG. 1. In FIG. 2, GPC chromatograms of N-2 (reference numeral 1) and N-4 (reference numeral 2) were shown as examples. From these chromatograms, it could be seen that the molecular weights calculated in terms of polystyrene of N-2 and N-4 were 28,000 and 30,100, respectively.

A mixture liquid obtained by uniformly dissolving and dispersing 1,3,5-tris (4-t-butyl-3-hydroxy-2,6-dimethylbenzyl) isocyanurate and the urethane urea polymer (A) having the tertiary nitrogen groups at the terminals prepared above, by high-speed stirring, in the DMAc solution of the urethane urea polymer (B) prepared in Preparation Example 1, was added to the aforementioned polyurethane urea polymer (B) solution, and the mixture was stirred. Thereby, a uniform spinning dope was obtained. The addition amount of the isocyanurate compound was 1 part by mass, and the addition amount of the polyurethane urea polymer (A) represented by the general formula (1) was set to the value (parts by mass) shown in Table 2, with respect to 100 parts by mass of the total solid content of the polyurethane urea polymer (B).

TABLE 1

| Terminal tertiary nitrogen-containing polyurethane urea polymer | Tertiary nitrogen-containing amino compound and addition amount | | Number average molecular weight of terminal tertiary nitrogen-containing polyurethane polymer |
|---|---|---|---|
| | Tertiary nitrogen-containing amino compound | Amount added to polyurethane urea polymer (B) (parts by mass) | |
| N-1 | Diethylaminopropylamine | 3 | 31,000 |
| N-2 | Diethylaminopropylamine | 5 | 28,000 |
| N-3 | Dimethylaminoethylamine | 5 | 20,000 |
| N-4 | Diethylaminoethylamine | 5 | 30,100 |
| N-5 | Dibutylaminopropylamine | 5 | 33,000 |

TABLE 2

| Example | Terminal tertiary nitrogen-containing polyurethane polymer shown in Table 5 | Addition amount | Scum evaluation (Note 1) (grade) | Spinning stability (times/hr) | Heat cut in seconds (190° C.) | Heat setting property (%) | Dyeability and color fastness with interlaced nylon | | Dyeing with dispersion dye | |
|---|---|---|---|---|---|---|---|---|---|---|
| | | | | | | | Dyeability (grade) | Color fastness to cleaning (Δ grade) | (Degree of contamination of dry cleaning liquid) (grade) | |
| | | | | | | | | | Polyurethane bare knit fabric | Ester-blended knit fabric |
| 1 | N-1 | 3 | 5 | 0.12 | 110 | 61 | 5 | 1 | 3.5 | 4 |
| 2 | N-2 | 3 | 5 | 0.11 | 115 | 63 | 5 | 1 | 3.5 | 4 |
| 3 | N-2 | 5 | 4 | 0.14 | 101 | 60 | 5 | 1 | 3.5 | 4 |
| 4 | N-3 | 3 | 5 | 0.12 | 106 | 68 | 5 | 1 | 3.5 | 4 |
| 5 | N-4 | 3 | 4 | 0.11 | 99 | 60 | 5 | 1 | 3.5 | 4 |
| 6 | N-5 | 3 | 4 | 0.13 | 102 | 59 | 5 | 1 | 3.5 | 4 |
| Comparative Example 1 | — | — | 5 | 0.19 | 105 | 20 | 1 | 0 | 3 | 3 |
| Comparative Example 2 | (Note 2) | 3 | 1 | 0.21 | 80 | 68 | 5 | 1 | 3 | 3.5 |

TABLE 2-continued

| Example | Terminal tertiary nitrogen-containing polyurethane polymer shown in Table 5 | Addition amount (Note 1) | Scum evaluation (grade) | Spinning stability (times/hr) | Heat cut in seconds (190° C.) | Heat setting property (%) | Dyeability and color fastness with interlaced nylon | | Dyeing with dispersion dye (Degree of contamination of dry cleaning liquid) (grade) | |
|---|---|---|---|---|---|---|---|---|---|---|
| | | | | | | | Dyeability (grade) | Color fastness to cleaning (Δ grade) | Polyurethane bare knit fabric | Ester-blended knit fabric |
| Comparative Example 3 | (Note 3) | 3 | 2 | 0.23 | 83 | 55 | 5 | 1 | 3 | 4 |
| Comparative Example 4 | (Note 4) | 27 | 4 | 0.24 | 78 | 52 | 3 | 1 | 3 | 4 |

(Note 1):
Parts by mass with respect to 100 parts by mass of the solid content of polyurethane urea polymer (B).
(Note 2):
Terminal tertiary nitrogen group-containing diaminourea compound synthesized according to Example 1 of Japanese Unexamined Patent Application, First Publication No. 2014-095162.
(Note 3):
Terminal tertiary nitrogen group-containing urethane polymer synthesized according to Example 1 of Japanese Unexamined Patent Application, First Publication No. 2014-091891.
(Note 4):
Terminal tertiary nitrogen group-containing urethane polymer synthesized according to Example 3 of Japanese Unexamined Patent Application, First Publication No. 2014-091891.

Comparative Example 1

A polyurethane elastic fiber was prepared in accordance with the method described above using a spinning dope of the polyurethane urea polymer (B) in which with respect to 100 parts by mass of the solid content of the polyurethane urea polymer (B) prepared in Preparation Example 1, only 1 part by mass of 1,3,5-tris (4-t-butyl-3-hydroxy-2,6-dimethylbenzyl) isocyanurate was added and the terminal tertiary nitrogen group-containing polyurethane urea polymer (A) was not added.

Comparative Example 2

[Production of Low Molecular Urea Compound]
According to Example 1 of Japanese Unexamined Patent Application, First Publication No. 2014-095162, synthesis was carried out as described below.
To a solution obtained by dissolving 52.5 parts of diethylaminopropylamine in 200 parts of DMAc (dimethylacetamide), a solution obtained by dissolving 50.0 parts of 4,4'-diphenylmethane diisocyanate in 300 parts of DMAc was gradually added dropwise. In addition, the dropwise addition was carried out by stirring while cooling so as to maintain the temperature at 10° C. to 20° C. After completion of the dropwise addition, stirring was continued for 2 hours.
A part of the obtained reaction solution was taken and dropped into water. A white precipitate was filtered, thoroughly washed with water and dried at 80° C. under reduced pressure. It was confirmed that the precipitate was a target compound having the tertiary nitrogen groups at both terminals of 4,4'-diphenylmethane diisocyanate which had a number average molecular weight calculated in terms of polystyrene of 4,900. A polyurethane elastic fiber was prepared using a polyurethane urea polymer solution in which the terminal tertiary nitrogen group-containing compound was uniformly added to a spinning dope, in which with respect to 100 parts by mass of the solid content of the polyurethane urea polymer (B), 1 part by mass of 1,3,5-tris (4-t-butyl-3-hydroxy-2,6-dimethylbenzyl) isocyanurate of Comparative Example 1, was added, so as to have the parts by mass described in Table 2.

Comparative Example 3

(Production of Polyurethane Urea Polymer Terminated Only with Tertiary
Nitrogen Groups and Having Main Chain by Urethane Bond Constituted by Prepolymer Synthesis Method)
The synthesis was carried out according to Example 1 of Japanese Unexamined Patent Application, First Publication No. 2014-091891.
400 g of polytetramethylene ether diol having a number average molecular weight of 1,800 and 91.7 g of 4,4'-diphenylmethane diisocyanate were reacted while stirring for 3 hours at 80° C. under a dry nitrogen atmosphere. In this case, the charged value (abbreviated as N value) of polyol and diisocyanate=(isocyanate equivalent of diisocyanate)/(hydroxyl equivalent of polyol) was 1.65. Thereby, a urethane prepolymer composed of a urethane bond and terminated with isocyanate groups was obtained. The urethane prepolymer was cooled to room temperature, and dissolved in 500 g of a DMAc solvent. A solution obtained by dissolving 37.6 g of diethylaminopropylamine in 300 g of DMAc was added dropwise thereto while vigorously stirring and cooling so as to maintain the temperature at 20° C. to 30° C. After completion of the dropwise addition, stirring was further continued for 2 hours.
It was confirmed from the measurement results of IR and GPC by taking a part of the solution mentioned above that the reaction product was a target polyurethane urea polymer represented by the formula (1) described in Japanese Unexamined Patent Application, First Publication No. 2014-091891, which had a number average molecular weight of 11,000. A polyurethane elastic fiber was produced by using a polyurethane urea polymer solution in which the urethane urea compound having the tertiary nitrogen groups only at the terminals was added to the spinning dope described in Comparative Example 1. The amount added was set to the value of parts by mass shown in Table 2.

Comparative Example 4

(Preparation of a Spinning Dope in which a Polyurethane Urea Polymerization is Carried Out Using a Tertiary Nitrogen Group-Containing Single Active Hydrogen Compound at a Part of a Terminal Stopper and the Adding and Mixing of a Terminal Tertiary Nitrogen Group-Containing Polyurethane Urea Polymer in the Polyurethane Urea Polymer are Carried Out at the Same Time, and Production of Polyurethane Elastic Fiber)

The synthesis was carried out in accordance with Example 3 of Japanese Unexamined Patent Application, First Publication No. 2014-091891.

400 g of polytetramethylene ether diol having a number average molecular weight of 1,800 and 91.7 g of 4,4'-diphenylmethane diisocyanate were reacted under stirring for 3 hours at 80° C. under a dry nitrogen atmosphere. Thereby, a urethane prepolymer having the terminals capped with isocyanate was obtained. After the obtained prepolymer was cooled to room temperature, 720 g of dimethylacetamide was added thereto and dissolved to prepare a urethane prepolymer solution. On the other hand, 8.11 g of ethylenediamine, 1.98 g of diethylaminopropylamine and 0.26 g of diethylamine were dissolved in 390 g of dimethylacetamide. The obtained solution was added to the prepolymer solution at room temperature to obtain a polyurethane solution having a viscosity of 285 Pa·s/30° C. This polymer contained the polyurethane urea polymer represented by the formula (1) in Japanese Unexamined Patent Application, First Publication No. 2014-091891 in an amount of 27 parts by mass based on 100 parts by mass of the other polyurethane urea polymer, in view of the charged amount of the tertiary amino compound. 1,3,5-tris (4-t-butyl-3-hydroxy-2,6-dimethylbenzyl) isocyanurate was added to a polyurethane urea polymer solution, in an amount of 1 part by mass with respect to 100 parts by mass of the solid content of the polyurethane urea polymer. The mixture was stirred, and thereby, a uniform spinning dope was obtained. A polyurethane elastic fiber was produced using the polyurethane urea polymer solution in which the urethane urea compound having the tertiary nitrogen groups at the terminals and having a high molecular weight was added. The addition amount thereof was set to the value of parts by mass shown in Table 2.

A GPC chromatogram (reference numeral 3) of the polyurethane urea polymer represented by the formula (1) in Japanese Unexamined Patent Application, First Publication No. 2014-091891 mentioned above was shown in FIG. 2. From this chromatogram, it could be seen that the molecular weight calculated in terms of polystyrene of this polymer was 75,000.

Comparative Example 5

Into a four-necked flask equipped with a stirrer and a thermometer, 310 g of PTMG having a number average molecular weight (calculated from OH value) of 3,100, 16.3 g of ethylene glycol having a molecular weight of 62, 91.5 g of MDI, and 577 g of DMAc were placed. The reaction was carried out for 7 hours at 70° C. under a dry nitrogen atmosphere. Subsequently, 13.1 g of n-butyl alcohol was added thereto, and the terminal stopping reaction was carried out for 1 hour and then cooled to 20° C. A polyurethane solution consisting only of urethane bonds, having no urea bond and having a concentration of 42.7%, a viscosity of 610 Pa·s/30° C., and a number average molecular weight of 100,000 was obtained. A solution obtained by adding 6.4 g of diethylaminopropylamine corresponding to the diamino compound (2) and 148.3 g of DMAc and uniformly mixing was added to 300 g of the obtained polyurethane solution. The temperature of the mixture was gradually increased to 100° C., and stirred under heating for 20 hours while the temperature was maintained at 100° C. The reaction mixture was cooled to room temperature. Diethylaminopropylamine corresponding to the diamino compound (2) in the reaction liquid was measured by means of liquid chromatography, but the diethylaminopropylamine was only slightly decreased. In view of this, it could be seen that it was difficult for compounds having no urea bond in the polyurethane resin solution as the raw material to carry out the amino exchange reaction, and therefore, the terminal tertiary nitrogen group-containing urethane urea polymer (A) usable in the present invention could not be obtained.

Reference Example 1

(Production of Dope of Polyurethane Urea Polymer and Spinning Dope for Elastic Fiber)

400 g of polytetramethylene ether diol having a number average molecular weight of 1800 and 91.7 g of 4,4'-diphenylmethane diisocyanate were reacted under stirring under a dry nitrogen atmosphere for 3 hours at 80° C. Thereby, a urethane prepolymer having terminals capped with isocyanate was obtained. The reaction product was cooled to room temperature. Subsequently, 720 g of N,N-dimethylacetamide (hereinafter abbreviated as DMAc) was added thereto and dissolved to prepare a urethane prepolymer solution. On the other hand, 8.11 g of ethylenediamine and 1.37 g of diethylamine were dissolved in 390 g of DMAc and the obtained solution was added to the prepolymer solution under vigorous stirring at room temperature. Thereby, a solution of polyurethane urea polymer (B) (concentration: 31.1% by mass) having a viscosity of 310 Pa·s (30° C.) was obtained.

A solution of the polyurethane urea polymer in which only 1 part by mass of 1,3,5-tris (4-t-butyl-3-hydroxy-2,6-dimethylbenzyl) isocyanurate was added with respect to 100 parts by mass of the solid content of the polyurethane urea polymer (B) mentioned above was prepared as a spinning dope for polyurethane elastic fibers.

Reference Example 2

(Production of Terminal Tertiary Nitrogen Group-Containing Polyurethane Urea Polymers (A) NPU-1 to NPU-5)

Into 300 g of the solution of the polyurethane urea polymer (B) prepared in Reference Example 1, a solution obtained by dissolving 1.87 g of diethylaminopropylamine (corresponding to 2 parts by mass based on 100 parts by mass of the solid content of the aforementioned (B)) in 120 g of DMAc was added. The mixture was stirred and mixed so as to be homogeneous, and gradually heated to 100° C. The mixture was stirred and heated for 15 hours while the temperature was maintained at 100° C. The reaction mixture was cooled to room temperature. Thereby, a solution of a polyurethane urea polymer (A) (NPU-1) having the tertiary nitrogen groups at the terminals and having a viscosity of 76 mPa·s/25° C. was produced.

In the same manner as described above, the terminal tertiary nitrogen group-containing polyurethane urea polymers (A) (NPU 2 to NPU 5) were prepared by adding the tertiary nitrogen-containing amino compounds shown in Table 3 to the solution of the polyurethane urea polymer (B) prepared in Reference Example 1, in the amounts corresponding to the parts by mass shown in Table 3 with respect to 100 parts by mass of the solid content of the aforementioned (B). NPU 2 to NPU 5 were shown in Table 3.

TABLE 3

| Terminal tertiary nitrogen-containing polyurethane urea polymer (A) | Tertiary nitrogen-containing amino compound and addition amount | | Number average molecular weight of terminal tertiary nitrogen-containing polyurethane polymer |
|---|---|---|---|
| | Tertiary nitrogen-containing amino compound | Amount added to polyurethane urea polymer (B) (parts by mass) | |
| NPU-1 | Diethylaminopropylamine | 2 | 32,500 |
| NPU-2 | Diethylaminopropylamine | 3 | 29,000 |
| NPU-3 | Dimethylaminoethylamine | 3 | 24,000 |
| NPU-4 | Diethylaminoethylamine | 3 | 32,000 |
| NPU-5 | Dibutylaminopropylamine | 3 | 35,000 |

Reference Example 3

(Production of Polymers (PA1 to PA4) of Compounds Having Anionic Functional Groups)

Copolymer compositions of the polymers of the compounds having anionic functional groups prepared in accordance with the methods described in Japanese Unexamined Patent Application, First Publication No. 2009-024320 and Japanese Unexamined Patent Application, First Publication No. 2012-193259 were shown in Table 4. Table 4 indicated each monomer as the raw material and the number of moles thereof charged for polymerization. In the table, the polymer average molecular weight was measured by using GPC.

TABLE 4

Polymer of compound having polyanionic functional group compound

| Type | Carboxy group corresponding monomer (charged molar amount) | Copolymerization monomer (all the charged amounts = 1 mol) | Weight average molecular weight |
|---|---|---|---|
| PA-1 | Maleic anhydride [1.5 mol] | $HC = CH_2$<br>$\vert$<br>$O = C - O(C_2H_4O)_8 - H$ | 18500 |
| PA-2 | Maleic acid [1.8 mol] | $H_2C = C - CH_3$<br>$\vert$<br>$O = C - O(C_3H_6O)_7 - H$ | 19300 |
| PA-3 | Methacrylic acid [2.8 mol] | $HC = CH_2$<br>$\vert$<br>$CH_2O - (C_3H_6O) - (C_2H_4O)_{13} - CH_3$ | 12000 |
| PA-4 | Japanese Unexamined Patent Application, First Publication No. 2009-24320 (compound of [1] described in Example 3) | $\left[\begin{array}{c}CH_2-CH\\\vert\\CH_2\\\vert\\SO_3H\end{array}\right]_f \left[\begin{array}{cc}CH-CH\\\vert\quad\vert\\O=C\quad C=O\\\vert\quad\vert\\OH\quad OH\end{array}\right]_g$<br>f:g = 60:40 | |

Examples 7 to 14

A uniform spinning dope was obtained by adding a liquid, which was formed by uniformly dissolving and dispersing the polyurethane urea polymer (A) having tertiary nitrogen groups at the terminals shown in Table 3 and the polymer of the compound having the anionic functional group shown in Table 4 in the corresponding amounts of parts by mass with respect to 100 parts by mass of the solid content of the polyurethane urea polymer (B) (the addition amounts shown in Table 5) by stirring at high speed, to the spinning dope of the solution of the polyurethane urea polymer (B) prepared in Reference Example 1.

A polyurethane elastic fiber was produced using this spinning dope, and the results of evaluation thereof were shown in Table 5.

TABLE 5

| Example | Terminal tertiary nitrogen-containing polyurethane polymer (A) (addition amount) (Note 1)) | Polymer of compound having anionic functional group (addition amount (Note 1)) | Dyeability and color fastness with interlaced nylon | | Dyeing with dispersion dye (Degree of contamination of dry cleaning liquid) (grade) | | Spinning stability (times/hr) | Heat cut in seconds (190° C.) | Heat setting property (%) | Scum (Yarn scum: grade) |
|---|---|---|---|---|---|---|---|---|---|---|
| | | | Dyeability (grade) | Color fastness to cleaning (Δ grade) | Polyurethane bare knit fabric | Ester-blended knit fabric | | | | |
| 7 | NPU-1 (1 part by mass) | PA-1 (1 part by mass) | 5 | 1 | 3.5 | 4 | 0.13 | 130 | 65 | 5 |
| 8 | NPU-1 (2 parts by mass) | PA-1 (1 part by mass) | 5 | 1 | 3.5 | 4 | 0.14 | 128 | 68 | 5 |
| 9 | NPU-1 (3 parts by mass) | PA-1 (3 parts by mass) | 5 | 1 | 3.5 | 4 | 0.12 | 141 | 70 | 4 |
| 10 | NPU-2 (1 part by mass) | PA-2 (1 part by mass) | 5 | 1 | 3.5 | 4 | 0.15 | 110 | 60 | 5 |
| 11 | NPU-3 (2 parts by mass) | PA-2 (2 parts by mass) | 5 | 1 | 3.5 | 4 | 0.18 | 118 | 61 | 4 |
| 12 | NPU-4 (2 parts by mass) | PA-3 (3 parts by mass) | 5 | 1 | 3.5 | 4 | 0.12 | 122 | 65 | 4 |
| 13 | NPU-5 (2 parts by mass) | PA-4 (3 parts by mass) | 5 | 1 | 3.5 | 4 | 0.16 | 131 | 58 | 5 |
| 14 | (Note 2) (3 parts by mass) | PA-1 (1 part by mass) | 5 | 1 | 3.5 | 4 | 0.16 | 127 | 55 | 5 |
| Comparative Example 5 | — | — | 1 | 0 | 3 | 3 | 0.18 | 121 | 20 | 5 |
| Comparative Example 6 | — | PA-1 (3 parts by mass) | 1 | 0 | 3 | 3 | 0.21 | 115 | 30 | 5 |
| Comparative Example 7 | — | PA-2 (3 parts by mass) | 1 | 0 | 3 | 3 | 0.20 | 117 | 40 | 5 |
| Comparative Example 8 | — | PA-3 (3 parts by mass) | 1 | 0 | 3 | 3 | 0.23 | 125 | 28 | 5 |
| Comparative Example 9 | — | PA-4 (3 parts by mass) | 1 | 0 | 3 | 3 | 0.28 | 115 | 30 | 5 |
| Comparative Example 10 | NPU-1 (1 part by mass) | — | 4 | 1 | 3 | 4 | 0.11 | 118 | 63 | 5 |
| Comparative Example 11 | NPU-1 (2 parts by mass) | — | 4 | 1 | 3 | 4 | 0.18 | 115 | 62 | 4 |
| Comparative Example 12 | NPU-1 (3 parts by mass) | — | 4 | 1 | 3 | 4 | 0.16 | 122 | 64 | 4 |
| Comparative Example 13 | (Note 2) (3 parts by mass) | — | 4 | 1 | 3 | 4 | 0.21 | 81 | 50 | 3 |
| Comparative Example 14 | (Note 3) (3 parts by mass) | — | 4 | 1 | 3 | 4 | 0.21 | 76 | 69 | 1 |

(Note 1):
Parts by mass with respect to 100 parts by mass of the solid content of polyurethane urea polymer (B).
(Note 2):
"Terminal tertiary nitrogen group-containing polyurethane urea polymer compound" synthesized according to Example 1 of Japanese Unexamined Patent Application, First Publication No. 2014-091891.
(Note 3):
Compound A of Table 1 of the Example of Japanese Unexamined Patent Application, First Publication No. 2014-095162.

Comparative Examples 5 to 14

A polyurethane elastic fiber was produced by blending the terminal tertiary nitrogen group-containing polyurethane urea polymer (A) shown in Table 3 and the polymer of the compound having the anionic functional group shown in Table 4 in the addition amounts shown in Table 5 using the spinning dope of the polyurethane urea polymer (B) solution prepared in Reference Example 1. The results of evaluation thereof were shown in Table 5.

The number average molecular weights calculated in terms of polystyrene of the polyurethane urea polymers used in Comparative Examples 13 and 14 were respectively 11,000 and 4,900.

Examples 15, 16, and 17

(Preparation of Inorganic Functional Agent Dispersion Adjustment Liquid and Evaluation Test of Dispersibility Due to Pressure Loss During Passing Through the Dope)

To the container, 150 g of solid fine particles of inorganic functional agents shown in Table 6 described below, 800 g of N,N-dimethylacetamide (DMAc), and 100 g of the terminal tertiary nitrogen group-containing polyurethane urea polymer (A) or the polycarboxylic acid-based copolymer of a polymer between a compound having an anionic functional group and an isobutylene/maleic anhydride/diamino compound described in Japanese Examined Patent Application, Second Publication No. H03-6177 were added. After the mixture was stirred for one hour at 6,000 rpm by means of a homomixer. Subsequently, 30 g of the spinning dope of the polyurethane urea polymer (b) dope prepared in Reference Example 1 mentioned above was added thereto. Subsequently, the mixture was stirred for one hour, and subsequently, 600 g of the spinning dope of the polyurethane urea polymer (B) dope was further added thereto. The mixture was stirred at 150 rpm for 2 hours. Thereby, various types of solid fine particle dispersion adjustment liquids for polyurethane elastic fibers were prepared. The liquid was transferred to a container made of stainless steel, and the liquid in the container was supplied with a gear pump under pressure with nitrogen gas, and was used for the evaluation test of dispersibility due to the pressure loss when the dope was passed through the sintered filter (20 μm or more cut). The compositions of the solid fine particle dispersion adjustment liquids were shown in Table 6 described below.

Comparative Examples 15 to 19

Table 6 shows the results of comparative evaluation using the terminal tertiary nitrogen group-containing polyurethane urea polymer (A) shown in Table 3, or the isobutylene-containing maleic anhydride/diamino compound reaction polymer described in Japanese Examined Patent Application, Second Publication No. H03-6177, or the polymer of the compound having an anionic functional group, in the polyurethane urea polymer (B) solution mentioned above, with the solid fine particles.

and is useful as inner wear, outer wear, legging, sportswear, jeans wear, swimsuit and sanitary materials.

EXPLANATION OF SYMBOLS

1 N-2 compound
2 N-3 compound
3 Polyurethane urea polymer represented by the formula (1) in Japanese Unexamined Patent Application, First Publication No. 2014-091891
4 Polyurethane urea polymer (B) prepared in Preparation Example 1

What is claimed is:

1. A method for producing a polyurethane elastic fiber, comprising the steps of:
   (1) producing a polyurethane urea polymer (A) represented by general formula (1) described below, which has a number average molecular weight calculated in

TABLE 6

| Example | Terminal tertiary nitrogen-containing polyurethane polymer of Table 1 (addition amount (Note 1)) | Polymer of compound having anionic functional group (addition amount (Note 1)) | Solid fine particle Type | Primary particle size (μm) | Blending amount (Note 1) | Dispersibility evaluation test Discharge pressure change (kgf/cm²) |
|---|---|---|---|---|---|---|
| 15 | NPU-1 (1 part by mass) | PA-1 (1 part by mass) | Titanium oxide | 1.2 | 23.8 | 2.83 |
| 16 | NPU-1 (2 parts by mass) | PA-1 (2 parts by mass) | Hydrotalcite (Note 2) | 2.9 | 23.8 | 3.05 |
| 17 | Isobutylene/maleic anhydride/diamino compound (Note 3) (2 parts by mass) | PA-1 (2 parts by mass) | Titanium oxide | 1.2 | 23.8 | 3.88 |
| Comparative Example 15 | — | — | — | — | — | 1.56 |
| Comparative Example 16 | NPU-1 (2 parts by mass) | — | Titanium oxide | 1.2 | 23.8 | 18.93 |
| Comparative Example 17 | NPU-1 (2 parts by mass) | — | Hydrotalcite (Note 2) | 2.9 | 23.8 | 22.23 |
| Comparative Example 18 | Isobutylene/maleic anhydride/diamino compound (Note 3) (2 parts by mass) | — | Titanium oxide | 1.2 | 23.8 | 25.71 |
| Comparative Example 19 | — | PA-1 (1 part by mass) | Hydrotalcite (Note 2) | 2.9 | 23.8 | 2.88 |

(Note 1):
Parts by mass with respect to 100 parts by mass of the solid content of polyurethane urea polymer (B).
(Note 2):
Hydrotalcite is a substance of Note 1) described in Table 2 of Japanese Unexamined Patent Application, First Publication No. 2012-193259.
(Note 3):
Substance of A-2 described in Table 1 of Japanese Examined Patent Application, Second Publication No. H03-6177.

INDUSTRIAL APPLICABILITY

The polyurethane elastic fiber obtained by the preparation method of the present invention can improve dyeability and vivid color development, can improve color fastness even in washing and dry-cleaning, can ensure stable spinning productivity without deteriorating heat resistance, and can exhibit superior metal abrasion resistance without formation of scum.

The polyurethane elastic fiber obtained by the preparation method of the present invention possesses superior dyeability, color fastness during cleaning, spinning stability, heat setting properties, anti-yarn scum property, and metal (knitting needle) abrasion resistance, and is useful as a polyurethane elastic fiber material for use in inner wear, outer wear, legging, sportswear, jeans wear, swimsuit and sanitary materials, which exhibit the superior product quality.

In addition, the polyurethane elastic fiber obtained by the preparation method of the present invention possesses superior dyeability, color fastness during cleaning, heat setting property, and metal (knitting needle) abrasion resistance, terms of polystyrene ranging from 12,000 to 50,000, and has tertiary nitrogen groups at the terminal groups, by adding a diamino compound (2) represented by general formula (2) described below in a ratio ranging from 0.01 to 15 parts by mass with respect to 100 parts by mass of a solid content of a polyurethane urea polymer (B), and subsequently heating, wherein said polyurethane urea polymer (B) is produced by reacting a urethane prepolymer having a terminal isocyanate group which is obtained by a reaction between a high-molecular diol and diisocyanate in an excess amount with respect to said high-molecular diol, with a bifunctional active hydrogen-containing compound which is able to form a urea group by reacting with an isocyanate group;

(2)

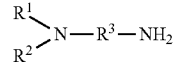

{wherein R¹ and R² each independently represent an alkyl group or a hydroxyalkyl group, having 1 to 5 carbon atoms, or R¹ and R² are bonded to form a heterocyclic group together with the nitrogen atom to which they are bonded, and R³ represents a linear or branched alkylene group having 1 to 5 carbon atoms}

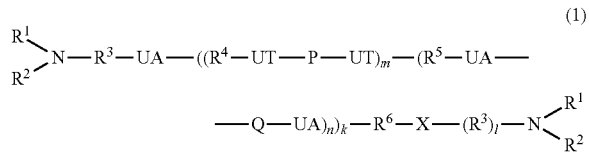

(1)

{wherein R¹ and R² are the same or different and represent a linear or branched alkyl group or hydroxyalkyl group having 1 to 5 carbon atoms, or R¹ and R² are bonded to form a heterocyclic group together with the nitrogen atom to which they are bonded, R³ is a linear or branched alkylene group having 1 to 5 carbon atoms, X is a urea bond, R⁴, R⁵ and R⁶ are the same or different diisocyanate residue, P is a diol residue, Q is a diamine residue, UT is a urethane bond, UA is a urea bond, each of k, l, m and n is a positive number, l is 1}

(2) preparing a spinning dope containing a solvent by adding a solid content of said polyurethane urea polymer (A) in a ratio of 0.01 to 20 parts by mass with respect to 100 parts by mass of a solid content of another polyurethane urea polymer (B) which is obtained by reacting a prepolymer obtained by a reaction between a high-molecular diol and diisocyanate, with an active hydrogen-containing compound; and (3) spinning a polyurethane elastic fiber using said spinning dope.

2. The method for producing a polyurethane elastic fiber, according to claim 1, wherein said spinning dope comprises a polymer of a compound having an anionic functional group.

3. The method for producing a polyurethane elastic fiber, according to claim 2, wherein said anionic functional group is selected from the group consisting of a carboxyl group, a sulfonic acid group, a nitro group, and a phosphoric acid group.

4. The method for producing a polyurethane elastic fiber, according to claim 2, wherein said anionic functional group is contained in an amount of 10 mmol/kg or more and 200 mmol/kg or less in said polyurethane elastic fiber.

5. The method for producing a polyurethane elastic fiber, according to claim 1, wherein said polyurethane elastic fiber comprises an inorganic functional agent selected from the group consisting of a fatty acid metal salt having 5 to 40 carbon atoms in which the metal is selected from the group consisting of magnesium, calcium, aluminum, and zinc; titanium oxide; zinc oxide; a metal complex salt of silica and zinc oxide; a hydrotalcite compound; a huntite compound; a solid solution of MgO and ZnO; a composite of silicon dioxide and zinc oxide; a composite salt of silicon dioxide and zinc oxide; a composite salt of silicon dioxide, zinc oxide, and alumina; porous synthetic silica; carbon black; a coloring agent; and a pigment, in a ratio ranging from 0.1 to 10 parts by mass of with respect to 100 parts by mass of the solid content of said another polyurethane urea polymer (B).

* * * * *